United States Patent [19]

Sarandrea et al.

[11] Patent Number: 4,748,573

[45] Date of Patent: May 31, 1988

[54] TEST MANAGEMENT SYSTEM TO ACQUIRE, PROCESS AND DISPLAY TEST DATA

[75] Inventors: Bryan M. Sarandrea, Aurora; Philip Schaten, Englewood; Samir K. Dalal, Monument; Laurence V. Koppelberger, Littleton; Lester F. Schowe, Monument; Andrew E. Richards, Littleton, all of Colo.

[73] Assignee: Honeywell Inc., Minneapolis, Minn.

[21] Appl. No.: 749,837

[22] Filed: Jun. 28, 1985

[51] Int. Cl.⁴ .................... G06F 3/14; G06F 15/36
[52] U.S. Cl. .................... 364/551; 364/900; 364/582
[58] Field of Search ............ 364/200, 900, 550, 551, 364/442, 582

[56] References Cited

U.S. PATENT DOCUMENTS

| | | | |
|---|---|---|---|
| 3,665,416 | 5/1972 | Hikosaka | 364/200 |
| 3,779,457 | 12/1973 | Cornyn Jr. et al. | 364/582 |
| 3,905,025 | 9/1975 | Davis et al. | 364/200 |
| 4,125,896 | 11/1978 | Metcalf | 364/582 |
| 4,215,406 | 7/1980 | Gomola et al. | 364/200 |
| 4,418,388 | 11/1983 | Allgor et al. | 364/551 |
| 4,456,963 | 6/1984 | Wiggins | 364/551 |
| 4,471,435 | 9/1984 | Meisner | 364/442 |
| 4,514,822 | 4/1985 | Schneider et al. | 364/900 |

Primary Examiner—Felix D. Gruber
Attorney, Agent, or Firm—Charles L. Rubow

[57] ABSTRACT

A test management system acquires, processes and displays test data. A control processor operating system operates independently of a disk file server operating system to control the operation. The test data is received from any analog signal lines which are sampled at predetermined rates and digitized or received as digital data. The digital data is collected and stored in a random access memory. A control processor analyzes the data and displays the analyzed data on a monitor. The digital data and analyzed data may be stored on disk. The digitized data may be sampled to determine if predetermined limits are exceeded and control signals may be sent back to the originating signal generator indicating corrective action.

18 Claims, 14 Drawing Sheets

COMMUNICATION CONTROLLER 20

STRAIN GAUGE, 2 KHZ LOGIC 32

STRAIN GAUGE, 1.2 HZ LOGIC 34

ANALOG OUTPUT LOGIC 40

DIGITAL INPUT/OUTPUT LOGIC 42

RELAY OUTPUT LOGIC 44

TEST MANAGEMENT SYSTEM TO ACQUIRE, PROCESS AND DISPLAY TEST DATA

RELATED APPLICATION

The following U.S. patent application, assigned to the same assignee as the instant application, is related to the instant application, and is incorporated herein by reference.

U.S. patent application Ser. No. 705,164 filed Feb. 25, 1985 by Samir K. Dalal, and entitled "Sample Data Acquisition System Using Microprocessor Controlled Sequence Having FIFO Buffer, DAM Controller" now U.S. Pat. No. 4,718,004.

BACKGROUND OF THE INVENTION

1. Field of the Invention

The invention relates generally to apparatus for acquiring data for analysis and control, and more specifically to a data processing system for collecting data in the form of analog or digital signals, digitizing the signals as necessary and analyzing the digitized data.

2. Description of the Prior Art

Data acquisition systems may be coupled to sensing and other input devices by signal lines, some providing analog signals, and others, digital signals. The amplitudes and/or frequencies of the analog signals may be sampled at a predetermined rate to generate a digital representation at the times of sampling. The digital signals may also be sampled at a predetermined rate or may be processed in real time. The amplitudes of analog signals may, for example, represent temperature, pressure, velocity or even light intensity. The frequencies of the analog signals may, for example, represent vibration.

A typical data acquisition system may sample and analyze such signals for a number of reasons. The system may monitor the temperature of a chemical reaction to determine if safe limits are being exceeded or if the next stage of a process should be initiated. The system may monitor the change in velocity of a test crash vehicle to gather data to design a better bumper. The system may monitor the frequency of vibrations of a machine to anticipate failure. The system may monitor temperature and humidity in a factory to keep such conditions within certain prescribed limits. Or, the system may measure how light intensity varies with time when testing a flash bulb. The latter information could be used to compare various designs of flash bulbs.

Prior art systems are capable of collecting data at high sampling rates and offer high resolution. However, these systems typically require highly skilled operators to set up the systems for data collection and analysis, since the systems generally must be programmed for each job individually. The operators must also keep track of test setups, data and analysis functions being performed. A further problem with prior art systems is that it is generally difficult to change parameters on the fly when performing a particular test.

OBJECTS OF THE INVENTION

Accordingly, it is a primary object of the invention to provide an improved data acquisition system.

It is also an object of the invention to provide a data acquisition system having a simple operator interface.

It is another object of the invention to provide a data acquisition system capable of automatic test management.

SUMMARY OF THE INVENTION

The present invention is a test management system for acquiring, processing and displaying test data, the test management system including a data acquisition system comprising a common logic subsystem, a global memory subsystem, a control processor subsystem, a graphics processor subsystem, a communication controller and a disk controller, all coupled to a VME bus, a number of signal conditioners coupled to a data collection system (DSC) bus, and a sequencer and a collect processor coupled to both the DCS bus and the VME bus. The graphics processor subsystem is coupled to the control processor subsystem via an RS232C port, and receives system clock and system reset signals from the VME bus.

Analog and digital signals are sampled and the voltage and/or frequency values digitized by the signal conditioners at programmed sampling rates. A data word representative of each sampled digitized value is applied to the sequencer via the DCS bus and is transferred to global memory via the VME bus for storage.

A system master operating system resides in a read only memory of the control processor subsystem. The control processor subsystem initializes the overall test management system and acts as a system controller and resource manager. The control processor subsystem handles all internal and certain VME bus interrupts. An operator inputs test plan information into the data acquisition system through the graphics processor subsystem into the control processor subsystem. The control processor subsystem translates the test plan information into commands which are given to the other subsystems, typically the collect processor and the disk controller.

The sequencer collects data from the DCS bus according to an address table set up by the collect processor and transfers the data to the global memory subsystem via the VME bus. The sequencer includes a scan table memory which stores the global memory subsystem addresses of the signal conditioners. The addresses are stored in the global memory by the control processor subsystem.

The collect processor initializes the sequencer to start collecting data, and, once started, the sequencer transfers data between the DCS and VME busses without interruption.

The common logic subsystem performs system controller functions such as deciding which subsystem shall have control of the VME bus, providing the reference voltage for the signal conditioners, providing the basic system timing signals, and providing clock calendar information which is kept current by battery backup which provides power when the primary power is off.

The disk controller serves as an interface between disk drives and the rest of the system. A file server operating system performs data file seeks, error checks and data transfers. The file server operating system notifies the data acquisition system that data requested from a disk is ready for transfer to the system. A microprocessor manages the disk controller functions.

The graphics processor subsystem displays graphics and alphanumeric information which is generated by the control processor and transferred to the graphics processor subsystem via an RS232C port. The graphics processor subsystem also provides an interface between the user and the control processor subsystem.

The global memory subsystem functions as a VME bus slave, and is available to any subsystem requesting service.

BRIEF DESCRIPTION OF THE DRAWINGS

The novel features which are characteristic of the invention are set forth with particularity in the appended claims. The invention itself, however, both as to organization and operation may best be understood by reference to the following description in conjunction with the drawings in which:

DESCRIPTION OF THE PREFERRED EMBODIMENT

Figure 1:
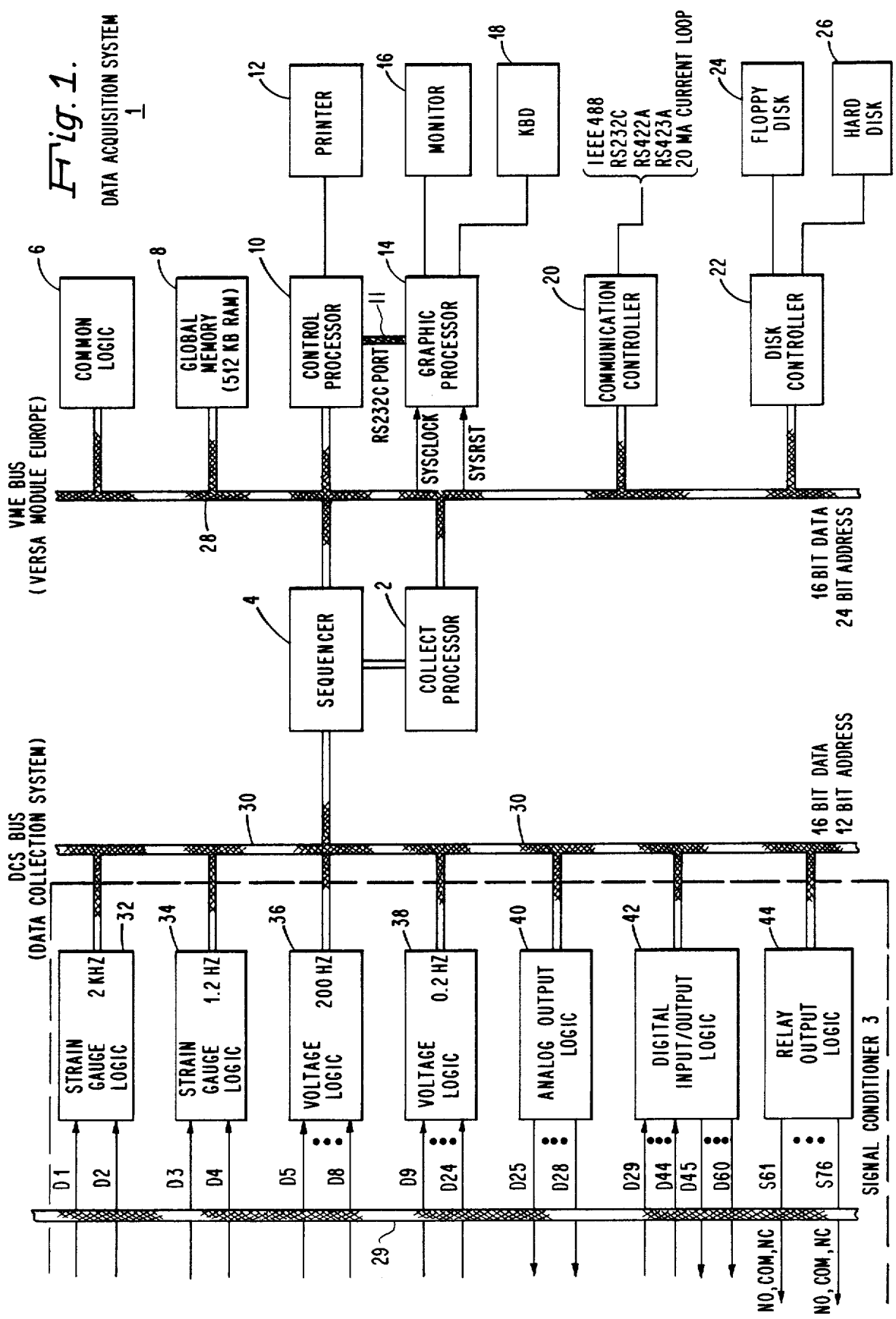
FIG. 1 is an overall block diagram of the data acquisition system.

In FIG. 1 the overall data acquisition system is identified by reference numeral 1. A signal conditioner 3 receives external signals via a connection 29. Externally generated analog signals D1 through D24 are converted to 16-bit digital data words for transfer over a data collection system (DCS) bus 30 by signal conditioner 3 which includes strain gauge 2 KHz logic 32, strain gauge 1.2 Hz logic 34, voltage 200 Hz logic 36 and voltage 0.2 Hz logic 38.

Anaog output logic 40 converts digital data signals received from DCS bus 30 to voltage or current analog signals D25 through D28 for transfer to external devices via connection 29. Digital input/output logic 42 receives digital signals D29 through D44 via connection 29, and supplies digital signals D45 through D60 to external devices via connection 29.

Relay output logic 44 incldues transfer contacts for switching signals S61 through S76 to control external devices. Normally open, normally closed and common contact leads are provided for each set of transfer contacts.

The analog signals D1 through D24 are sampled under the control of a collect processor 2. Analog signals D1 and D2 are sampled and digitized at a rate of up to 10,000 samples per signal line per second for transfer to DCS bus 30. Similarly, analog signals D3 and D4 are sampled and digitized at a rate of up to 6 samples per signal line per second for transfer to DCS bus 30. Analog signals D5 through D8 are sampled and digitized at a 1 KHz sample rate for transfer to DCS bus 30. Analog signals D9 through D16 are each sampled and digitized every 167 seconds for transfer to DCS bus 30.

Analog output signals D25 through D28 are generated by converting 12-bit digital signals received by DCS bus 30 from collect processor 2 at a rate determined by the collect processor.

Digital input signals D29 through D44 are supplied to digital input/output logic 42 which may be configured to operate in any one of four modes: word transfer, edge detect, change of state detect, or pattern detect. Sampling can be continuous, or it can be triggered by either an internal (GET) signal or an external strobe.

Digital output signals D45 through D60 are provided at a rate specified by collect processor 2.

Data acquisition system 1 is controlled by operating system software residing in a control processor 10. Control processor 10 loads variables such as gain, sampling levels and other calibration information into the logic of signal conditioner 3. It also loads the data acquisition programs into a memory in collect processor 2, and conditions memories in a sequencer 4 to allow the sequencer to be operative with specified logic elements 32 through 44 for transfer to address locations in a global memory 8.

Control processor 10 also controls the transfer of data between global memory 8 and a printer 12 via a Versa Module Europe (VME) bus 28; between global memory 8 and a graphic processor 14 via VME bus 28 and bus 11 for display on a monitor 16; between global memory 8 and a communication controller 20 via VME bus 28; and between global memory 8 and a disk controller 22 via VME bus 28. Note that disk controller 22 may control a floppy disk 24 and a hard disk 26 or two floppy disks.

VME bus 28 is a standard bus interface which is described in a "VMEbus Specification Manual", Rev. B, August 1982 published by the VMEbus Manufacturing Group (Mostek, Motorola, and Signetics/Philips). The particular manual referred to is the Motorola version relating to MVMEBS/D1 Microsystems, VMEmodules, and the VMEbus specification, which is herein incorporated by reference.

Collect processor 2 and sequencer 4 perform high-speed collection of analog and digital data from signal conditioner 3, as well as provide digital signals to analog output logic 40, digital input/output logic 42 and relay output logic 44. Sequencer 4 collects data from signal conditioner 3 via DCS bus 30, and transfers the data to global memory 8 via VME bus 28.

Collect processor 2 controls sequencer 4 and interacts with other subsystems via VME bus 28. Collect processor 2 may interact with other subsystems including signal conditioner 3 while sequencer 4 is collecting data from signal conditioner 3. Collect processor 2 and sequencer 4 operations are more fully described in previously identified U.S. application Ser. No. 705,164.

Common logic 6 performs system controller functions as well as providing control for VME bus 28 access.

Figure 2:
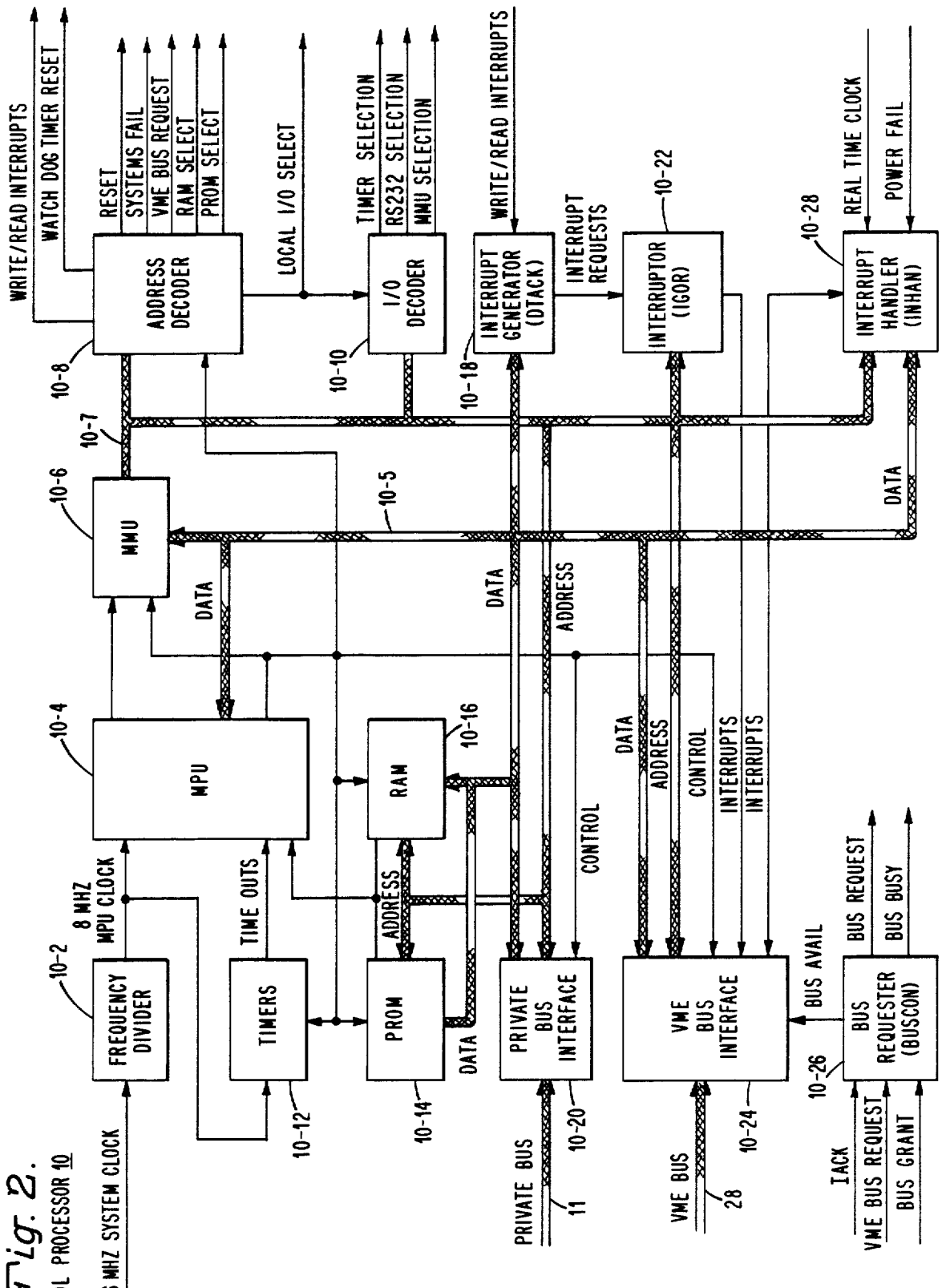
FIG. 2 is a block diagram of the control processor.

As shown in FIG. 2, control processor 10 includes a 16-bit microprocessor (MPU) 10-4, e.g., a Motorola MC 68000 microprocessor. Its operating system resides in a 64 kilobyte (KB) programmable read only memory (PROM) 10-14. A frequency divider 10-2 receives a 16 megahertz (MHz) system clock signal from common logic 6 to generate an 8 MHz clock signal which is applied to microprocessor 10-4 as an MPU clock and to timers 10-12. Timers 10-12 include a real time clock which provides for generation of predetermined timeouts which are applied to MPU 10-4. Timers 10-12 also include a watchdog timer which causes a system fail signal to be sent out on VME bus 28 if two consecutive local timer interrupts are not properly acknowledged, thereby alerting the data acquisition system that a catastrophic failure has occurred.

A memory management unit (MMU) 10-6 converts logical addresses received from MPU 10-4 to physical addresses on address bus 10-7. A 32 KB random access memory (RAM) 10-16 and PROM 10-14 receive the physical addresses from the MMU for reading data bytes onto a data bus 10-5. RAM 10-16 also responds to the physical addresses by reading or writing data bytes from or onto data bus 10-5.

Address bus 10-7 signals are also sent to or received from a private bus 11 via a private bus interface 10-20, and sent to or received from VME bus 28 via a VME bus interface 10-24. In addition, address bus 10-7 signals are applied to an address decoder 10-8 to generate a number of control signals, including write/read interrupt signals. The write/read interrupt signals are applied to an interrupt generator 10-18 which indicates the number of wait states incurred when accessing local resources. PROM 10-14 and RAM 10-16 require two wait states.

A watchdog timer reset signal applied to timers 10-12 resets the watchdog timer to indicate that control processor 10 is functioning. If the watchdog timer is not reset, MPU 10-4 generates address signals which are applied to address decoder 10-8 via MMU 10-6 to generate a system fail signal. A reset signal causes control processor 10 to revert to an initialized condition.

A VME bus request signal is applied to a bus requester 10-26 when MPU 10-4 requires access to VME bus 28. A RAM select signal and a PROM select signal from address decoder 10-8 activate RAM 10-16 and PROM 10-14, respectively. A local I/O select signal also from address decoder 10-8 activates an I/O decoder 10-10 and printer 12 or graphic processor 14. When the I/O decoder is activated, address bus 10-7 signals are decoded to generate a timer select signal which activates timers 10-12, an RS232 selection signal which activates communication controller 20, and an MMU selection signal which activates MMU 10-6.

Interrupt generator 10-18 receives write/read interrupt signals from address decoder 10-8, and receives data signals from MPU 10-4 which specifies the device to be interrupted. Interrupt signals are received by an interruptor (IGOR) 10-22 to generate VME bus interrupts which are applied to VME bus interface 10-24. Bus requestor (BUS CON) 10-26 supplies a bus request signal to VME bus 28 in response to a VME bus request signal from address decoder 10-8. VME bus 28 responds with a bus grant signal when the VME bus is available. BUS CON 10-26 sends out a BUSBUSY signal to MPU 10-4 when the BUS CON has control of VME bus 28. An interrupt acknowledge (IACK) signal received from VME bus 28 indicates that control processor 10 may prepare to connect to the VME bus.

An interrupt handler (INHAN) 10-28 prioritizes all VME bus interrupts and local interrupts, such as real time clock timeout and power fail. INHAN 10-28 acknowledges the interrupting device and sends signals to MPU 10-4 indicating the highest priority interrupt to be processed by the MPU.

Figure 3:
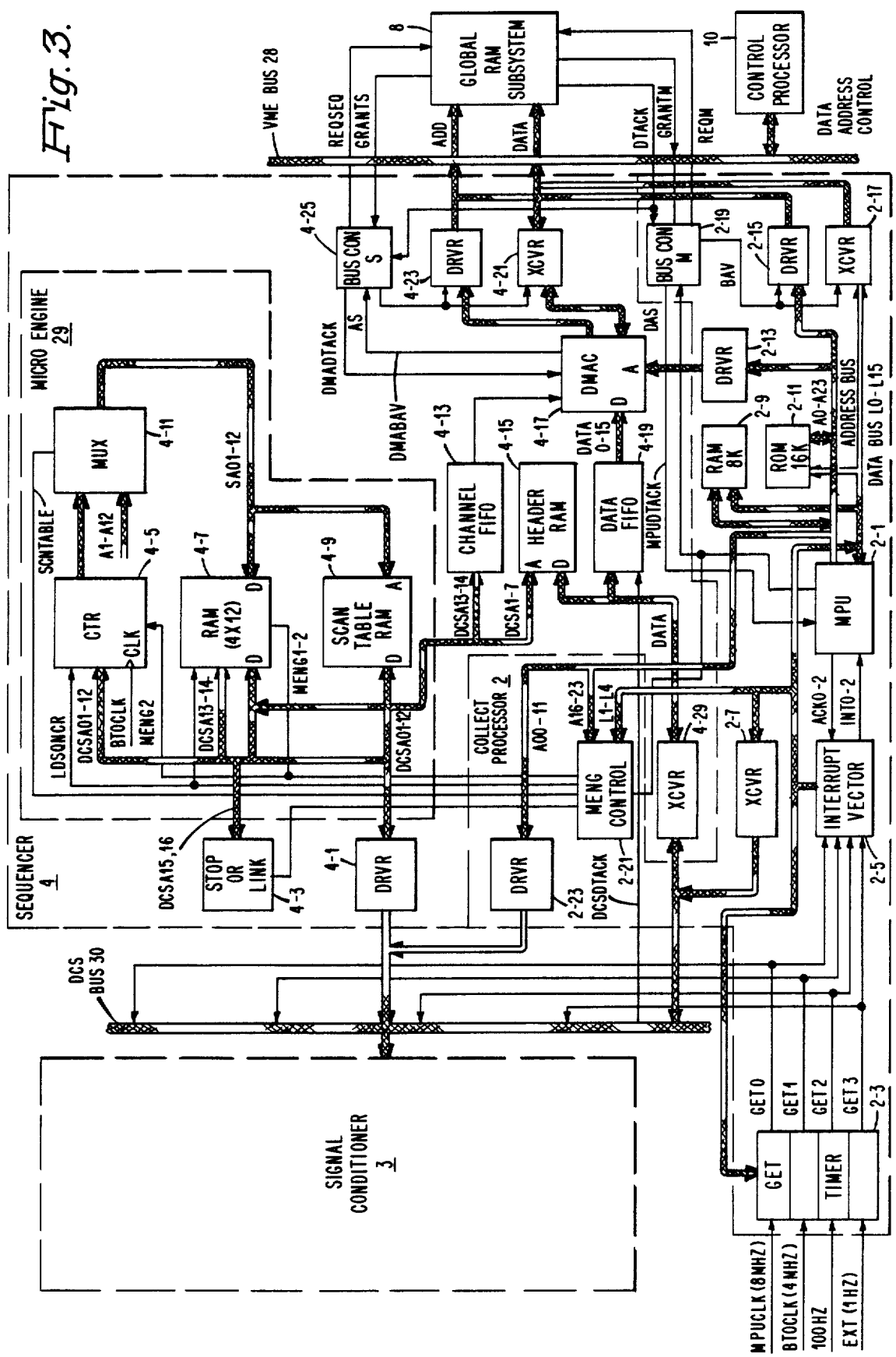
FIG. 3 is a block diagram of the collect processor and sequencer.

FIG. 3 shows the logic of collect processor 2 and sequencer 4 which perform high speed data collection operation. The data is collected from signal conditioner 3 via DCS bus 30, and is transferred to global memory 8 via VME bus 28. This collection operation is fully described in the aforementioned U.S. application Ser. No. 705,164.

The data is collected at four different frequencies. These frequencies are generated by a GET timer 2-3 and applied to a processor 2-1 and DCS bus 30 as signals GET0, GET1, GET2 and GET3. These signals are selectively wired to signal conditioner logic 32 through 44 shown in FIG. 1, and determine the sampling rate for the particular signal conditioner logic unit.

The data collected from signal conditioner 3 is stored in global memory 8 in four frequency groups, one frequency group for each frequency. Each frequency group may be further divided into signal scan groups. The scan groups are separated by header data for identification and other information, for example, collection time.

Collect processor 2 includes GET TIMER 2-3 which is set up under program control to generate GET0 signals at a 100 microsecond rate, GET1 signals at a one millisecond rate, GET2 signals at a 1/6 second rate and GET3 signals at a one second rate. The GET0 signal is generated by an 8 MHz MPUCLK signal which counts down a first predetermined value stored in GET TIMER 2-3. The GET1 signal is generate by a 4 MHz BTOCLK signal counting down a second predetermined value. The GET2 signal is generated by a 100 Hz signal counting down a third predetermined value and the GET3 signal is generated by an externally applied signal counting down a fourth predetermined value. The four predetermined values are stored in GET TIMER 2-3 during the initialization sequence.

As an example, the GET0 signal applied to strain gauge logic 32 samples analog signals D1 and D2 every 100 microseconds. The GET1 signal applied to strain gauge logic 34 samples analog signals D3 and D4 every millisecond. The GET2 signal applied to voltage logic 36 samples analog signals D5 through D8 every 1/6 second, and the GET3 signal applied to voltage logic 38 samples analog signals D9 through D24 every second. Similarly, signals GET0–GET3 may be applied to digital input/output logic 42 to sample signals D29 through D44.

Sequencer 4 is initialized as a part of a power-up sequence by control processor 10 loading global memory 8 with information. MPU 2-1 addresses the information to load memories in a microengine 29 in sequencer 4.

A scan table memory RAM 4-9 is loaded in four sections. Each section is associated with a particular GET0–GET3 signal which is applied to signal conditioner 3. Each section is loaded in successive locations with a header RAM 4-15 address followed by the addresses of the locations in RAM on the signal conditioner 3 logic boards storing the digitized data words representing the sampled analog signals. As an example, the section in scan table RAM 4-9 associated with strain gauge logic 32 will store three addresses, the header RAM 4-15 address and the two addresses in the RAM of strain gauge logic 32 which store digitized sample values of analog signals D1 and D2. Header RAM 4-15 receives four 16-bit data words, one data word providing the header information for each logic board of signal conditioner 3.

A 4×12 RAM 4-7 receives the starting scan table RAM 4-9 address minus one for each of the four sections associated with respective signal conditioner 3 logic board.

A direct memory access controller (DMAC) 4-17 receives the addresses it sends to global memory 8 for storing the digitized data words of the sampled analog signals.

An interrupt vector 2-5 receives the order of priority of the GET signals, with GET0 signal receiving the highest priority and GET3 signal receiving the lowest priority. In response to signals GET0-GET3, interrupt vector 2-5 applies signals INT0, INT1 and INT2 to MPU 2-1. Signals INT0, INT1 and INT2 are coded to indicate the highest priority GET signal requesting access to sequencer 4 since more than one GET signal may be active at the same time. MPU 2-1 acknowledges the receipt of the highest priority signal by generating acknowledge signals ACK0, ACK1 and ACK2, coded to indicate the GET signal that is being processsed.

MPU 2-1 starts sequencer 4 by branching to a routine in accordance with a program and microprograms stored in a RAM 2-9 and a ROM 2-11. MPU 2-1, as a consequence of executing the start routine, generates address bus signals A16 through A23 and data bus signals L1 through L4 which are applied to a microengine (MENG) control 2-21 to generate signals MENG0, MENG1 and MENG2 which are in turn applied to 4×12 RAM 4-7. Signals MENG0 and MENG1 select the one of four address locations associated with the highest priority GET signal selected by MPU 2-1 from interrupt vector 2-5. Signal MENG2 initiates a read operation. One less than the starting scan table RAM 4-9 address associated with the highest priority GET0, GET1, GET2 or GET3 signal is loaded into a counter 4-5 which is conditioned by a load sequencer signal LDSQNCR. Counter 4-5 increments the address to the starting address, and the output count representing a scan table RAM 4-9 location is applied from counter 4-5 via a multiplexer (MUX) 4-11 to scan table RAM 4-9 as signals SA01 through SA12. MUX 4-11 is conditioned to receive the address by a signal SCNTABLE from MENG control 2-21. Once loaded, counter 4-5 is incremented on each BTOCLK clock signal.

Scan table RAM 4-9 first generates the header RAM 4-15 address signals DCSA1 through DCSA7 to read the header data word into a data FIFO 4-19. Counter 4-5 then applies the next address signals SA01 through SA12 to scan table RAM 4-9 to generate the signal conditioner 3 logic board RAM addresses DCSA01 through DCSA12 via a driver 4-1. The data stored in the addressed location of the logic board RAM is transmitted through transceiver (XCVR) 4-29, and strobed in data FIFO 4-19 by signal DCSDTACK. This operation is continued until all the digitized data words are read into data FIFO 4-19 in response to the highest priority GET signal.

Signals DCSA13 and DCSA14 are also applied to a channel FIFO 4-13, decoded and read out to a DMAC 4-17 as signals CHREQ0 through CHREQ3. This indicates which digitized data words are processed by data FIFO 4-19 and, in turn, by DMAC 4-17. DMAC 4-17 organizes the digitized data in global memory 8 by block in accordance with the signal conditioner 3 digitized data words received.

Address signals SA01 through SA12 are stored in 4×12 RAM 4-7 each cycle at an address specified by signals DCSA13 and DCSA14. This enables the microengine 29 to restart after a higher priority signal conditioner 3 logic board requested service and as serviced. MPU 2-1 interrupts microengine 29 to process the higher priority request. MPU 2-1 interrupts the lower priority digitized data word transfer by applying address signals A16 through A23 and data signals L1 through L4 to MENG control 2-21 to generate signals MENG0, MENG1 and LDSQNCR. Signals MENG0 and MENG1 select the scan table RAM 4-9 starting address minus one of the higher priority from 4×12 RAM 4-7 which is loaded into counter 4-5 under control of the load sequencer signal LDSQNCR. Counter 4-5 increments the starting address minus one and applies the starting address to scan table RAM 4-9 for reading out the header RAM 4-15 address. Microengine 29 then returns to process the prior request by reading out the previously stored address from 4×12 RAM 4-7 into counter 4-5.

A DSCA15 signal from the scan table RAM 4-9 indicates the end of a microengine 29 - signal conditioner 3 processing cycle for this GET0, GET1, GET2 or GET3 sequence. Signal DCSA15 is applied to stop or link logic 4-3 which applies a STOP signal to MENG control 2-21 in order to activate the next highest priority digitized data word transfer.

A DCSA16 signal from the scan table RAM 4-9 indicates that the scan table RAM 4-9 will branch to the address specified by signals DCSA01 through DCSA12 for that data word. The DCSA16 signal is applied to stop or link logic 4-3 which applies a LINK signal to MENG control 2-21 to generate the LDSQNCR signal. This results in signals DCSA01 through DCSA12 being stored in counter 4-5 and 4×12 RAM 4-7 to address the next scan table RAM 4-7 location.

DMAC 4-17 requests VME bus 28 by generating an address strobe signal AS indicating that the DMAC has data to transfer to global memory 8. A bus requester BUS CON S 4-25 receives the AS signal and requests VME bus 28 by generating an REQSEQ signal. Global memory 8 grants access to the bus by generating a GRANTS signal which is applied to BUS CON S 4-25, which in turn generates a DMABAV signal which activates a driver 4-23 for transferring address information and a XCVR 4-21 for transferring the digitized data word to global memory 8 via VME bus 28.

MPU 2-1 may perform the same functions as microengine 29 by generating signal conditioner 3 address signals in response to its GET0, GET1, GET2 or GET3 signal received through interrupt vector 2-5. The address bus signals A00 through A11 are applied to signal conditioner 3 via a driver 2-23 and DCS bus 30. The digitized data words are received via DCS bus 30, a XCVR 2-7 and the data bus. MPU 2-1 stores the digitized data words in global memory 8 and generates an address enable signal DAS which is applied to a bus requester BUS CON M 2-19. BUS CON M 2-19 in turn requests VME bus 28 by generating signal REQM to global memory 8. Global memory 8 responds with a GRANTM signal to BUS CON M 2-19 which applies a BAV signal to activate a driver 2-15 and a XCVR 2-17, thereby enabling global memory 8 to write the digitized data word at the specified location.

Global memory 8 responds with a data acknowledge signal DTACK which is applied to both BUS CON S 4-25 and BUS CON M 2-19 to indicate that the data transfer is completed. If bus controller BUS CON S 4-25 is granted access to global memory 8, it generates a DMADTACK signal which is received by DMAC 4-17. DMAC 4-17 may then send the next digitized data word and address to global memory 8 via VME bus 28. Similarly, BUS CON M 2-19 generates a MPUDTACK signal to indicate to MPU 2-1 that the digitized data word and address information was received if BUS CON M 2-19 was granted access to VME bus 28.

During initialization DMAC 4-17 is coupled to the address bus via a driver 2-13. Address bus signals A1 through A12 are applied to MUX 4-11 to initialize scan table RAM 4-9, 4×12 RAM 4-7 and header RAM 4-15. Both interrupt vector 2-5 and GET TIMER 2-3 are coupled to the data bus during intialization.

Figure 4:
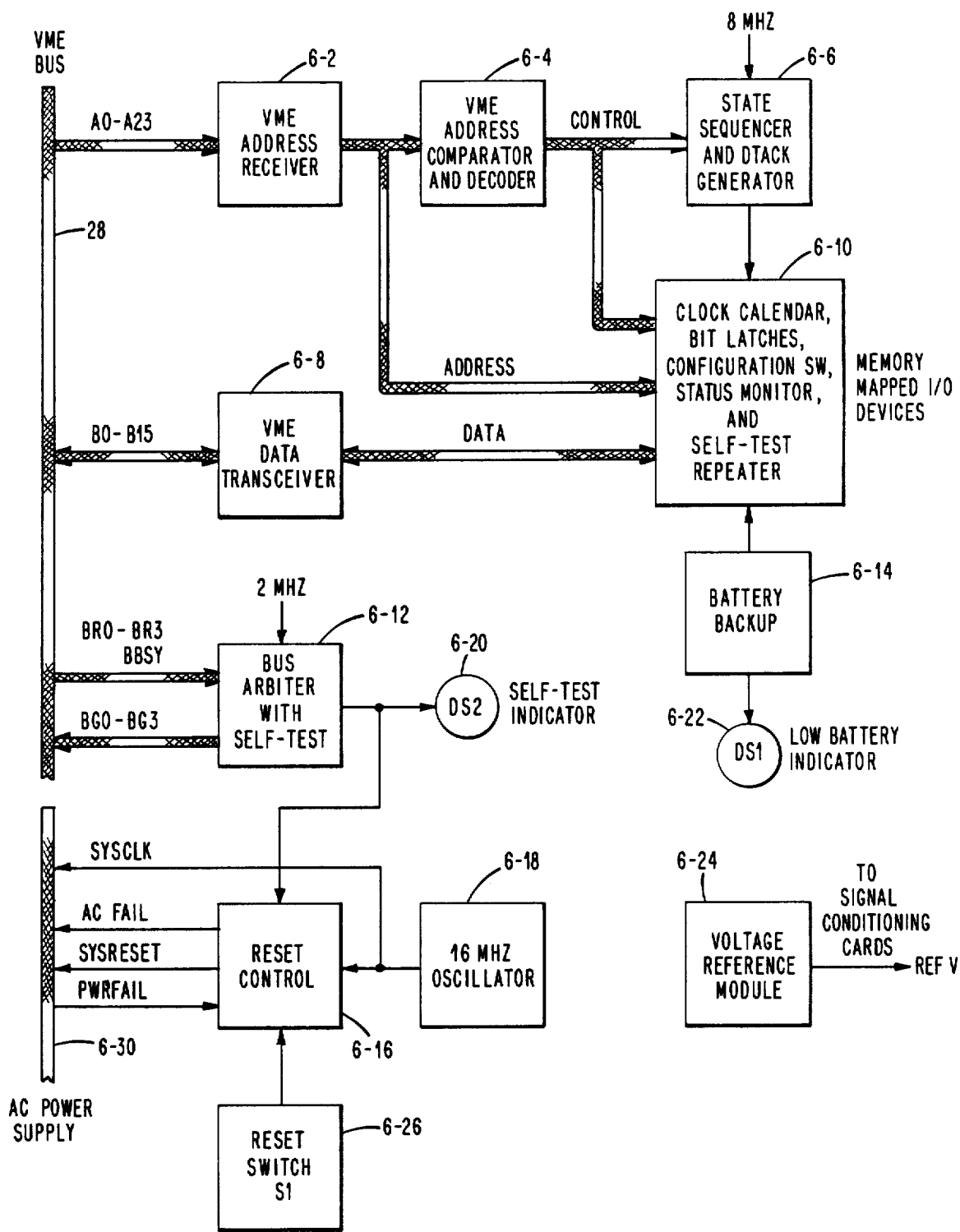
FIG. 4 is a block diagram of the common logic subsystem.

Referring to FIG. 4, common logic 6 performs system controller functions and provides additional service for any unit initiating a VME bus 28 action. The service functions performed include the following.

A VME bus arbiter 6-12 decides which of the units coupled to VME bus 28 is given control of the bus. Bus request signals BR0, BR1, BR2 and BR3 identify the units requesting the VME bus. Signals BG0, BG1, BG2 and BG3 grant access to the highest priority unit requesting the bus. A bus busy signal BBSY indicates that VME bus 28 is coupling two units for transfer of information betweem them.

VME bus arbiter 6-12 includes a self-test function which asserts bus requesters and verifies matching bus grant signals. A mismatch indicates a failure by lighting a self-test indicator DS2 6-20.

A 16 megahertz oscillator 6-18 provides the basic system clock frequency via a SYSCLK signal. Also generated are 2 MHz, 4 MHz and 8 MHz signals for distribution to the various units.

A reset control 6-16 generates a system reset signal SYSRESET when any one of four conditions occurs. The entire system is reset on initial power turn-on or when a reset switch S1 6-26 is depressed. The system is reset by the self-test function in bus arbiter 6-12 showing a mismatch between the bus request and bus grant. If the power supply indicates a power failure by power fail signal PWRFAIL, an AC FAIL signal is generated to allow the units to preset to a predetermined point.

A voltage reference module 6-24 generates a reference voltage which is applied to all logic boards of signal conditioner 3 in order to calibrate the logic boards.

A VME address receiver 6-2 buffers the address signals on VME bus 28. A VME address comparator and decoder 6-4 receives all address signals from the VME bus. Predetermined address signals are decoded to generate enable signals which are applied to a state sequencer and DTACK generator 6-6 and to memory mapped I/O devices 6-10.

State sequencer 6-6 is tied to the 8 MHz clock and performs multiplexing functions to adapt VME bus 28 address and data signals to internal common logic 6. The DTACK generator portion of the state sequencer 6-6 provides a handshaking function between VME bus 28 and common logic 6.

Within memory mapped I/O devices 6-10, a clock calendar provides time of day, date, days of the week, month and year. Leap year and daylight savings time are automatic. A battery backup 6-14 ensures memory retention of 8 days. If power is lost, a low battery indicator DS1 6-22 lights to indicate low battery voltage. Also included are a number of configuration switches to select global memory 8 size, system self-test LED function, 50/60 hertz AC power and mass storage configuration. A status monitor is also included. A byte read via a VME data transceiver 6-8 contains the following:

| Bit | |
|---|---|
| B0 | System self-test status |
| B1 | Arbiter self-test status |
| B2 | Battery level |
| B3 | VME signal SYSFAIL |
| B4 | Power supply over-temperature |
| B5 | Logic over-temperature |
| B6 | DC voltage out of balance |

Figure 5:
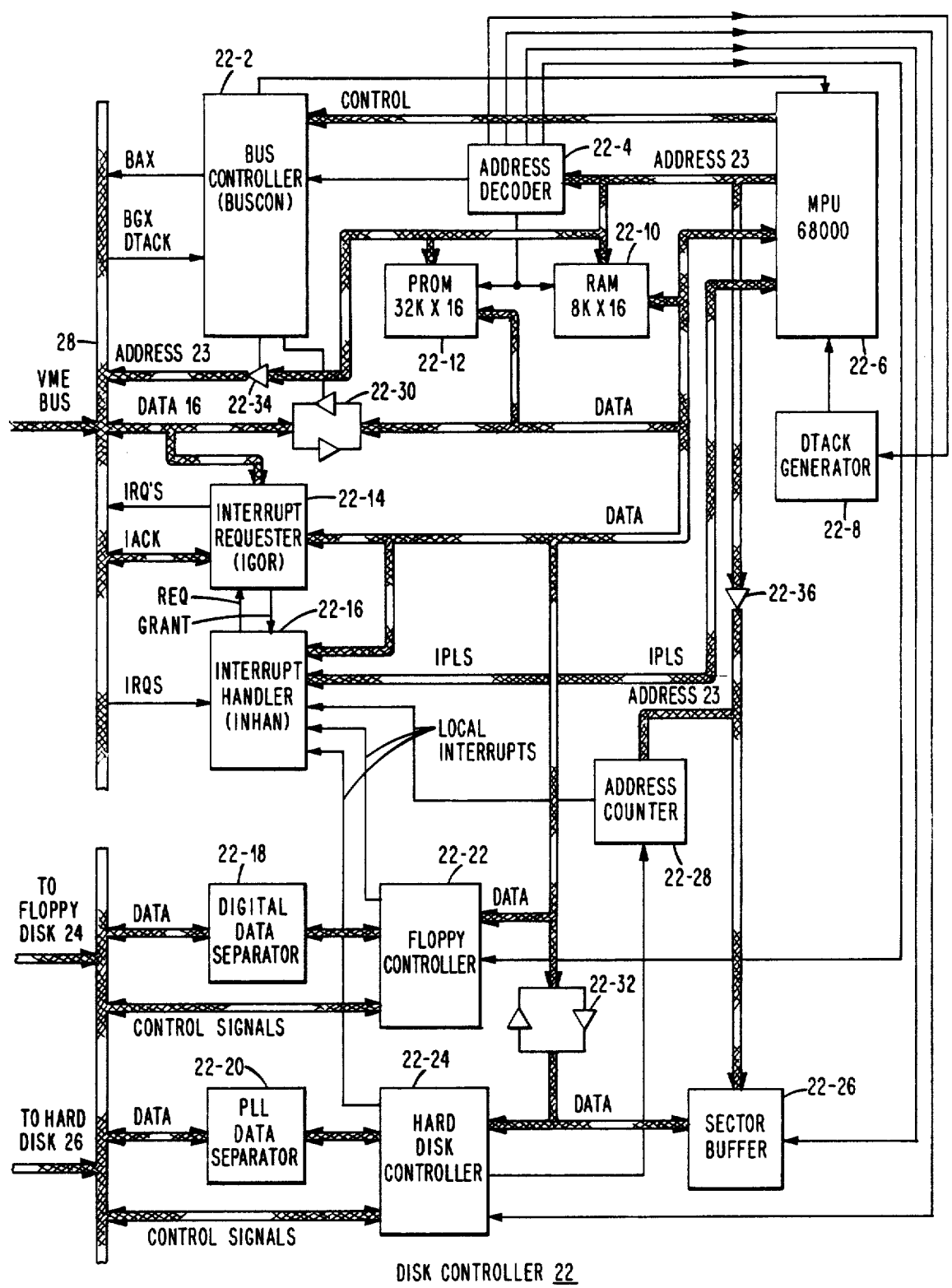
FIG. 5 is a block diagram of the disk controller.

Referring to FIG. 5, disk controller 22 serves as an interface between disk devices 24 and 26 and VME bus 28. It acts as a file server for the system, performing file seeks, error checks and data transfers. It notifies the system that the data requested from disk devices 24 and 26 is ready for transfer to the system via a microprocessor (MPU) 22-6 to manage its functions. All communication between disk controller 22 and the system is handled by interrupts.

Floppy disk 24 is coupled to a floppy controller 22-22 for the transfer of data via a digital data separator 22-18 which separates clock signals from data signals as well as performing write precompensation operations. The data received from floppy disk 24 is decoded, packed into bytes by floppy controller 22-22 and transferred to MPU 22-6. Floppy controller 22-22 stores information in its registers to select density, to turn the floppy disk 24 drive motor on and off, and to select write precompensation values. Floppy controller 22-22 initiates seeks, calculates the number of track step pulses to issue to floppy disk 24, and determines the direction of head movement. Floppy controller 22-22 also generates an interrupt signal which is applied to an interrupt handler (INHAN) 22-16 at the completion of a command operation.

Hard disk 26 operates at a much higher data rate than floppy disk 24. Data passes between a hard disk controller 22-24 and hard disk 26 via a phase locked loop (PLL) data separator 22-20 which tracks the short term speed variations of the hard disk. Hard disk controller 22-24 includes registers for storing head selection information, indicates the status of hard disk 26, and provides the starting address in a RAM 22-10 of the data to be transferred. The data is read into hard disk controller 22-24 where it is packed into bytes and stored in a sector buffer 22-26. Sector buffer 22-26 stores blocks of data and transfers a block of data during a block transfer operation.

A PROM 22-12 stores the microprograms that are executed by MPU 22-6 to perform the disk controller 22 operations. An address decoder 22-4 decodes the address signals received from MPU 22-6 to generate control signals to enable PROM 22-12, RAM 22-10, a DTACK generator 22-8, floppy controller 22-22, hard disk controller 22-24, and sector buffer 22-26. A bus controller (BUSCON) 22-2 generates a VME bus 28 request signal BAX in response to the address decoder 22-4 control signal.

A DTACK generator 22-8 determines the number of wait states incurred when accessing local resources. PROM 22-12, RAM 22-10 and sector buffer 22-26 incur no wait states.

Interrupt handler 22-16 receives request signals IRQ's from all units requesting access to VME bus 28, and also local interrupt request signals from an address counter 22-28, hard disk controller 22-24 and floppy controller 22-22, each of which communicates with global memory 8. When the local interrupt is the highest priority interrupt as determined by interrupt handler 22-16, it requests access to VME bus 28 by generating an REQ signal to an interrupt requestor (IGOR) 22-14. IGOR 22-14 generates an IRQ signal out on VME bus 28 which responds with an acknowledge signal IACK. It also generates a bus grant signal GRNT if disk controller 22 is responsive to the particular IACK signal received. It is noted that there is a discrete IACK signal for each interrupt requester in data acquisition system 1.

Interrupt handler 22-16 activates bus controller 22-2 which in turn signals MPU 22-6, a transceiver 22-30 and a driver 22-34 to send data signals and address signals respectively out on VME bus 28 or receive data signals from the VME bus. A transceiver 22-32 and a driver 22-36 are active during a block transfer between RAM 22-10 and a sector buffer 22-26.

Figure 6:
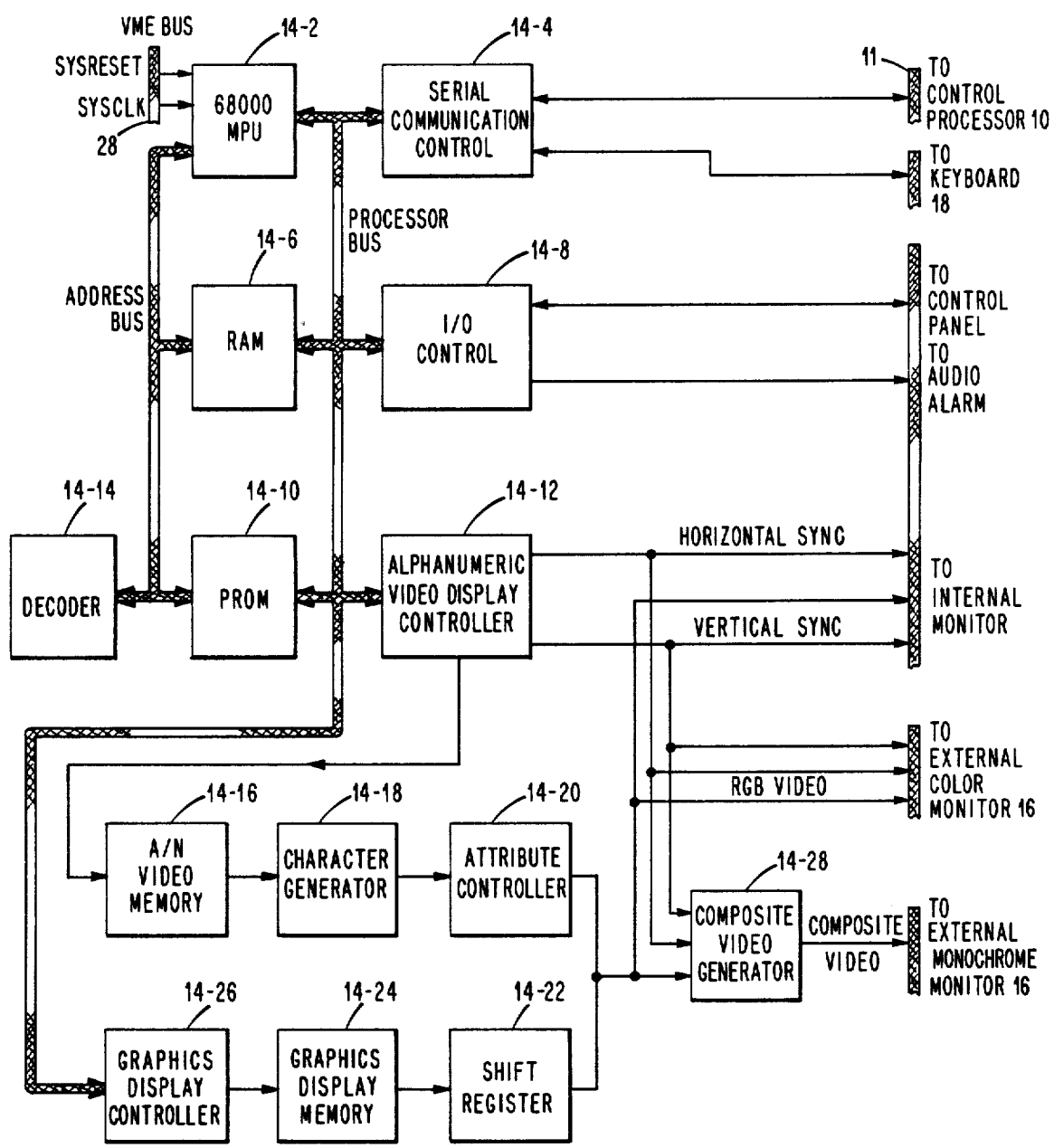
FIG. 6 is a block diagram of the graphics processor subsystem.

Referring to FIG. 6, the graphic processor 14 alphanumeric and/or graphics bit-mapped displays are shown to drive monitor 16 and also to act as an interface for keyboard 18. Display commands are received by an MPU 14-2, an alphanumeric video display controller 14-12 and a graphics display controller 14-26 from control processor 10 via private bus 11 and a serial communication control 14-4.

MPU 14-2 controls the alphanumeric and graphic display by microprograms stored in a PROM 14-10 and software programs stored in a RAM 14-6. Alphanumeric video display controller 14-12 generates horizontal and vertical sync signals to drive monitor 16, and also generates raster line signals and successive address signals which are applied to an A/N video memory 14-16 to read out successive character codes. The character codes are applied to address a character generator 14-18 which reads out a row of dots representing the portion of the characters appearing on the selected raster line. An attribute controller 14-20 may cause selected characters to have a high or low intensity, to blink or to have an inverse display.

Graphics display controller 14-26 addresses a graphics display memory 14-24 which is a bit map of the graphics portion of the display. The output is applied to a shift register 14-22. Both attribute controller 14-20 and the shift register 14-22 outputs are supplied to a composite video generator 14-28 for display on monochrome monitor 16, or supplied to a color monitor. The RBG video refers to the red, blue and green video signals. An internal monitor may operate in parallel with monitor 16.

An I/O control 14-8 generates signals related to operation of keyboard 18 to provide various audio levels to indicate keyboard key actuation.

Figure 7:
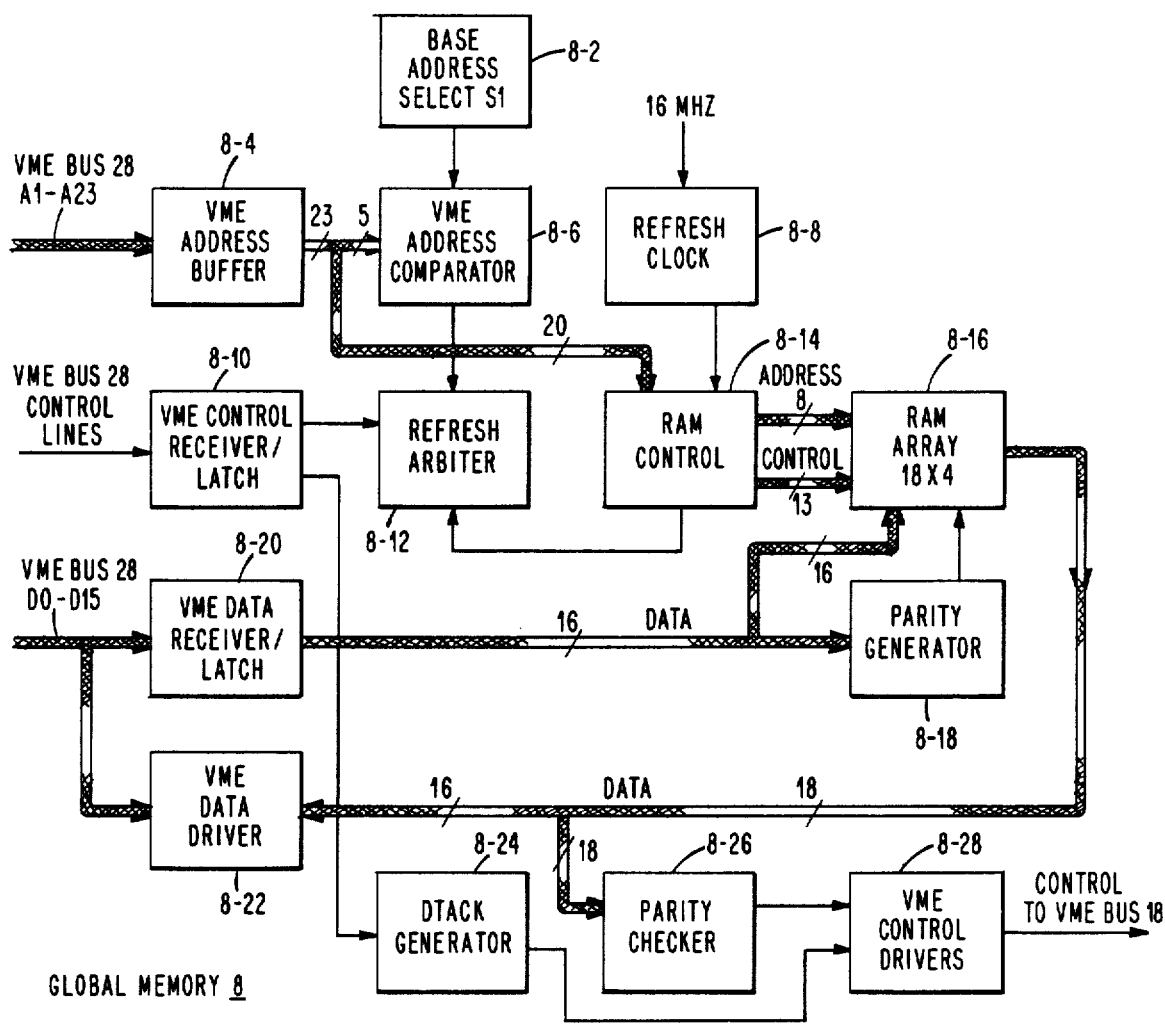
FIG. 7 is a block diagram of the global memory subsystem.

Referring to FIG. 7, global memory 8 provides 512 KB of random access memory (RAM). A base address select S1 8-2 sets the base address of global memory 8 by recognizing predetermined states of address signals A19 through A23. A VME address buffer 8-4 stores the address signals A1 through A23 and applies the signals to a VME address comparator 8-6. Comparator 8-6 compares the address with that set in base address select S1 8-2 and enables a refresh arbiter 8-12 to start a memory cycle.

A VME control receiver/latch 8-10 receives bus control signals and a VME data receiver/latch 8-20 receives bus data signals from VME bus 28, thereby freeing up the VME bus. This initiates a DTACK generator 8-24 and a RAM control 8-14 timing sequencer. RAM control 8-14 provides row and column address multiplexing for a RAM array 8-16. It is also coupled to a refresh clock 8-8 which receives a 16 MHz clock signal to generate refresh cycles.

A parity generator 8-18 generates an add parity for each byte written into RAM array 8-16. A parity checker 8-26 verifies all data bytes read from RAM array 8-16 for add parity. A VME data driver 8-22 sends the data signals onto VME bus 28.

DTACK generator 8-24 sends an acknowledge signal back to the unit requesting that global memory 8 perform a requested function. VME control drivers 8-28 send control signals indicating correct parity and acknowledging the completion of the function onto VME bus 28.

Figure 8:
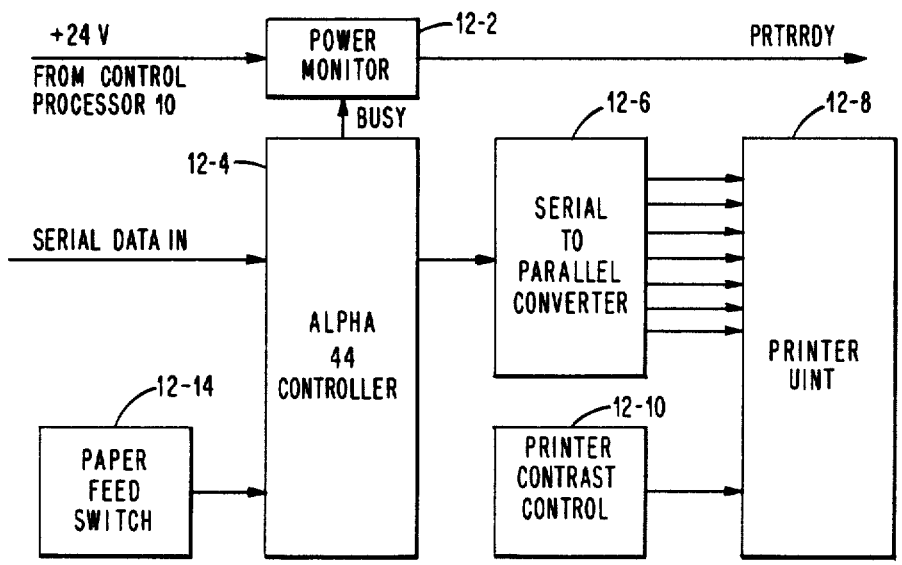
FIG. 8 is a block diagram of a printer suitable for use with the overall system.

Referring to FIG. 8, the printer 12 is a 40 column thermal printer with its controller. The printer interfaces to control processor 10. An alpha 44 controller 12-4 receives a serial stream of data bits in ASCII and transforms it into an array of dots in a serial to parallel converter 12-6 that is fed to a printer unit 12-8. Alpha 44 controller 12-4 contains the software necessary for motor control, character generation and serial interface. A printer contrast control 12-10 adjusts the printing contrast by varying the printer unit 12-8 motor speed.

A power monitor 12-2 monitors a 24 volt supply. If the voltage goes out of balance, a printer ready signal PRTRRDY is suppressed. Control processor 10, therefore, is responsive to the lack of signal and does not send data to printer 12. The PRTRRDY signal can also be inhibited by a busy signal from alpha 44 controller 12-4. Depressing a paper feed switch 12-14 advances the paper through printer unit 12-8 without printing.

Figure 9:
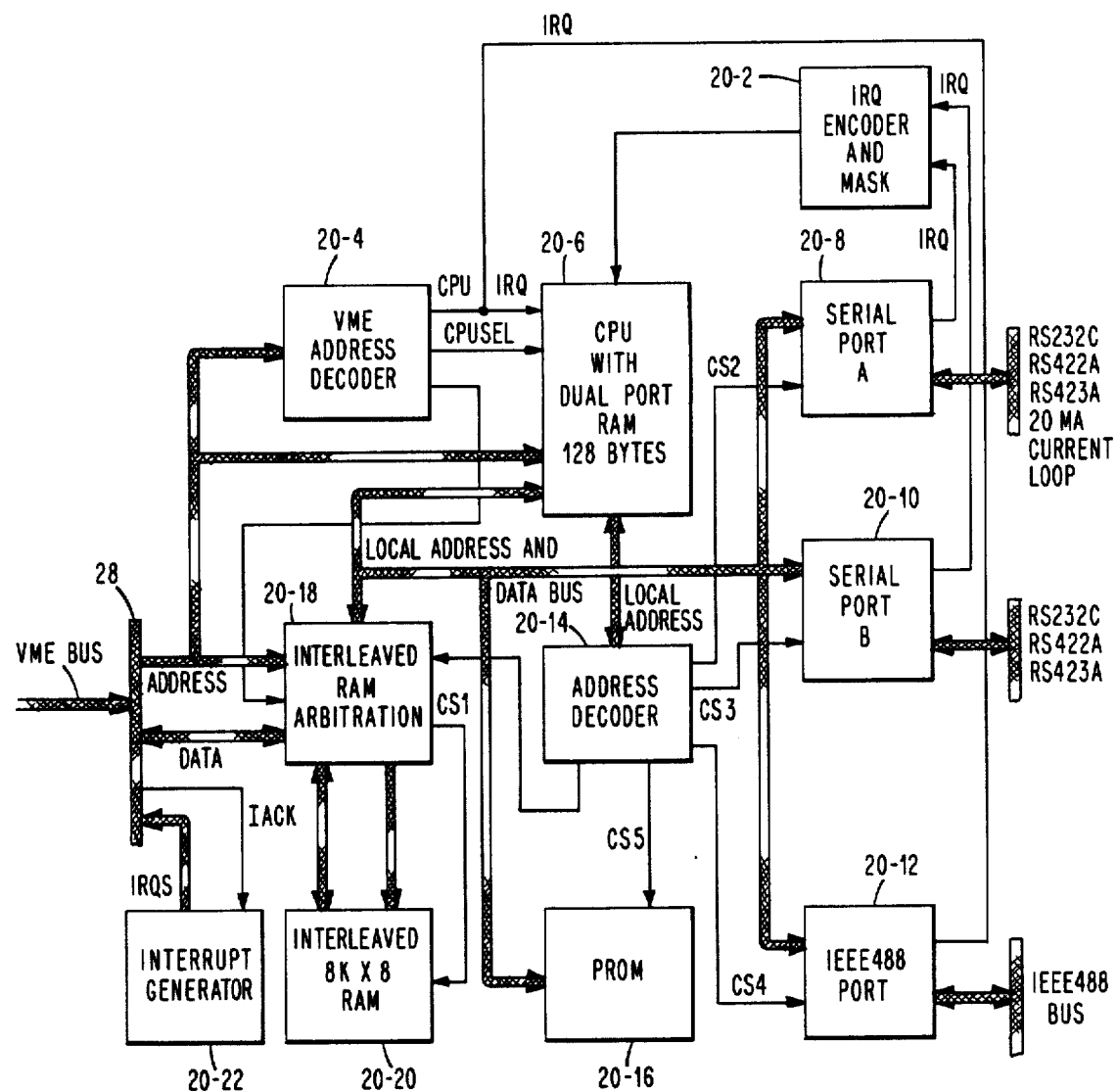
FIG. 9 is a block diagram of the communication controller.

Referring to FIG. 9, communication controller 20 provides the data acquisition system with an IEEE 488 port 20-12. A serial port A 20-8 may be configured to process RS232C, RS422A, RS423A or 20 MA current loop interfaces. A serial port B 20-10 may be configured to process RS232C, RS422A or RS423A interfaces. Communication controller 20 uses a Motorola 68121 microprocessor CPU 20-6 which includes 128 bytes of dual port RAM to control communication ports 20-8, 20-10 and 20-12 and to handle data.

Three local interrupts (IRQ) are used, one from each port, to tell CPU 20-6 when data is ready to be transmitted or received. An IRQ encoder and mask 20-2 receives interrupt request signals IRQ from serial port A 20-8 and serial port B 20-10. CPU 20-6 is responsive to signals from IRQ encoder and mask 20-2 and from IEEE 488 port 20-12 to apply address signals to an address decoder 20-14 which generates signal CS2, CS3 or CS4 to enable the requesting port. Address decoder 20-14 also enables a PROM 20-16 and an interleaved RAM arbitration 20-18 which generates signal CS1 to couple an interleaved 8K×8 RAM 20-20 to VME bus 28.

An interrupt generator 20-22 sends one of a number of interrupt request signals IRQS out on VME bus 28 and receives an interrupt acknowledge signal IACK when the requested device responds to its interrupt request signal.

A VME address decoder 20-4 monitors the address signals on VME bus 28 to enable CPU 20-6 via the CPU select signal CPUSEL and the CPU request signal CPU IRQ, and to enable interleaved RAM 20-20 via interleaved RAM arbitration 20-18.

Figure 10:
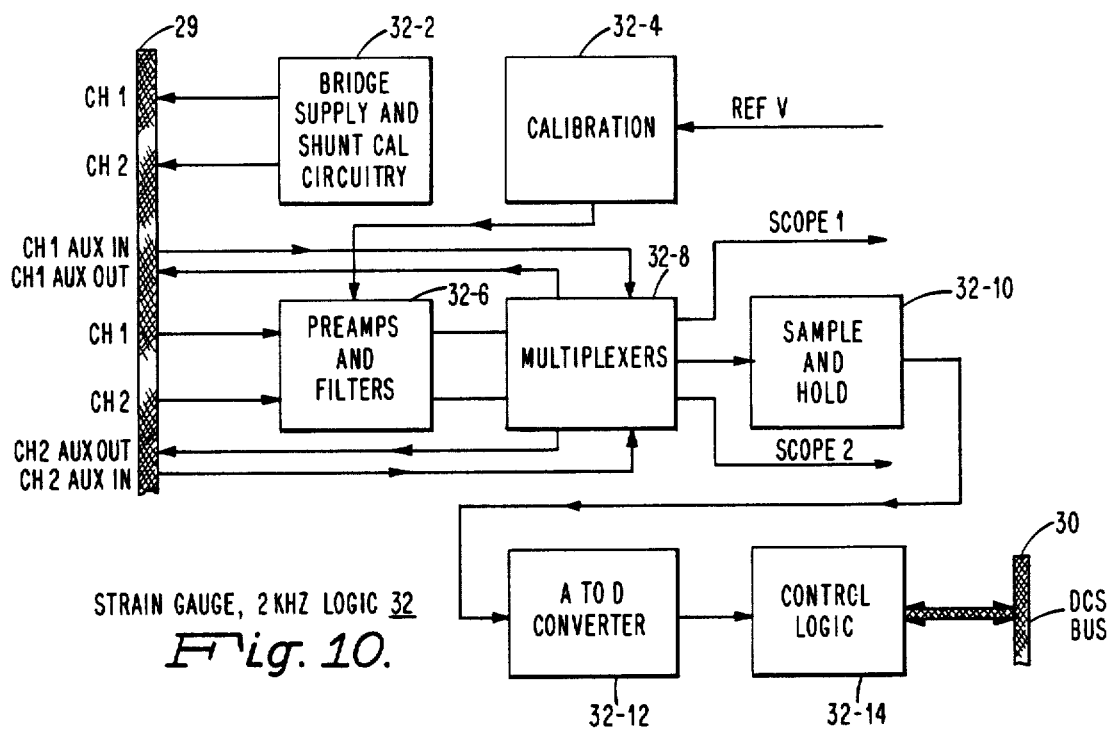
FIG. 10 is a block diagram of 2 KHz strain gauge logic suitable for use with the overall system.

Referring to FIG. 10, signal conditioner 3 includes 2 KHz strain gauge logic 32 to measure low level, medium frequency voltage signals from resistive thermodevices (RTD's), strain gauges and potentiometers. It has two signal channels, analog signal CH1 and analog signal CH2 in connection 29 having a maximum 3 dB analog bandwidth of 2 KHz.

A bridge supply and shunt calibration circuitry 32-2 provides excitation voltages and control of bridge shunts to the devices or gauges coupled to channels CH1 and CH2.

The channel CH1 and CH2 analog signals are applied to preamps and filters 32-6. Each channel has 3824 gain steps. An anti-aliasing filter has four programmable band edges with a maximum bandwidth of 2 KHz. Each preamplifier provides coarse gain control and is followed by a single-ended amplifier that provides fine gain settings. A suppression voltage is provided to scan out PC voltages at the input.

Multiplexers 32-8 select one of the two input channels or one of two auxiliary channels as an input to a sample and hold circuit 32-10. Also selected by multiplexers 32-8 are SCOPE 1 and SCOPE 2 signals. SCOPE 1 monitors the analog signal before the filter and after the gain stages of preamps and filters 32-6. SCOPE 2 monitors the analog signal after the filter of the selected channel.

The AUX IN and AUX OUT lines are intended for analog recording and for retrieval of data from analog storage instruments.

An analog to digital converter 32-12 converts the signal amplitude into a binary representation. Control logic 32-14 handles gain selection, converted digital data transmission, digital auto-correction, and interfacing between the analog signal processing section and DCS bus 30. Support circuitry for the control logic 32-14 includes a microprocessor, a RAM, a ROM and the serial digital interface circuits as described in the aforementioned application Ser. No. 705,164.

A calibration circuit 32-4 receives a reference votlage from voltage reference module 6-24 in FIG. 4.

Figure 11:
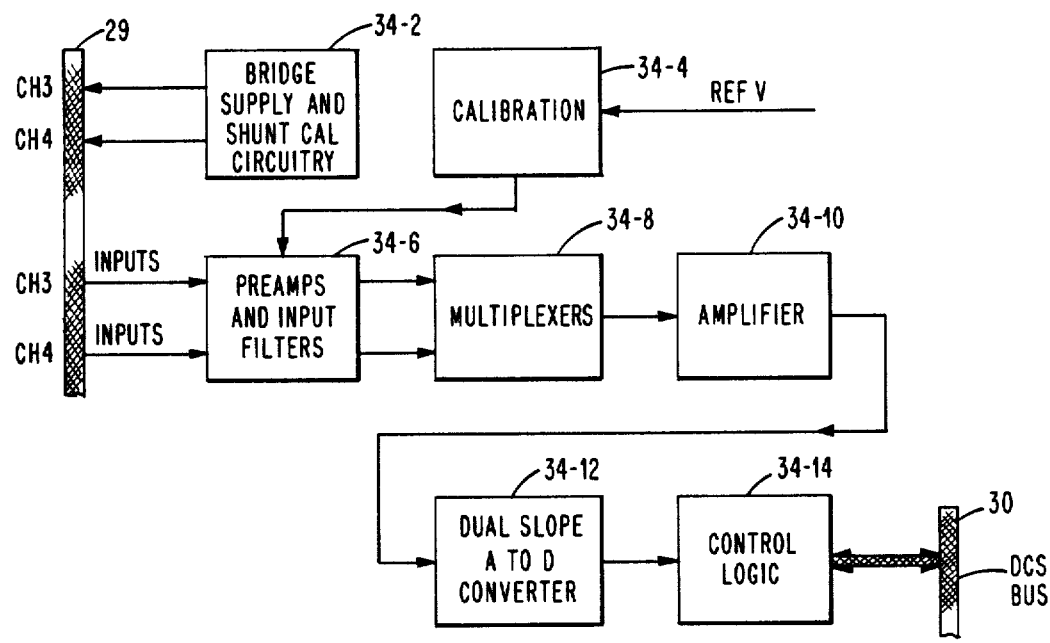
FIG. 11 is a block diagram of 1.2 Hz strain gauge logic.

FIG. 11 shows 1.2 Hz strain gauge logic 34 which measures low level, low frequency voltage signals from resistive thermodevices (RTD's), strain gauges and potentiometers. It has two signal channels CH3 and CH4 and a maximum 3 dB analog bandwidth of 1.2 Hz. Measurement functions such as gain, suppression level and calibration are digitally programmed and received over DCS bus 30.

Input signals are sampled and converted at a 6 sample per channel per second rate and made available to DCS bus 30 as normalized 16-bit words. A bridge supply and shunt calibration circuitry 34-2 provides excitation voltages and control of bridge shunts.

Channel CH3 and CH4 inputs are applied to preamplifiers and input filters 34-6. Single pole RC filters help to attenuate any power line frequency present at the inputs. Multiplexers 34-8 select one of the two analog input signals and supply that signal to a dual slope A to D converter 34-12 through an amplifier 34-10.

Control logic 34-14 processes gain selection, converted data transmission, digital auto-correction and the interfacing between the analog processing logic and DCS bus 30. Control logic 34-14 includes a microprocessor, a RAM, a ROM and serial digital interface logic.

Calibration 34-4 receives a reference voltage REF V which is switched in preamps and input filters 34-6 to calibrate the gain of the input channels CH3 and CH4.

Figure 12:
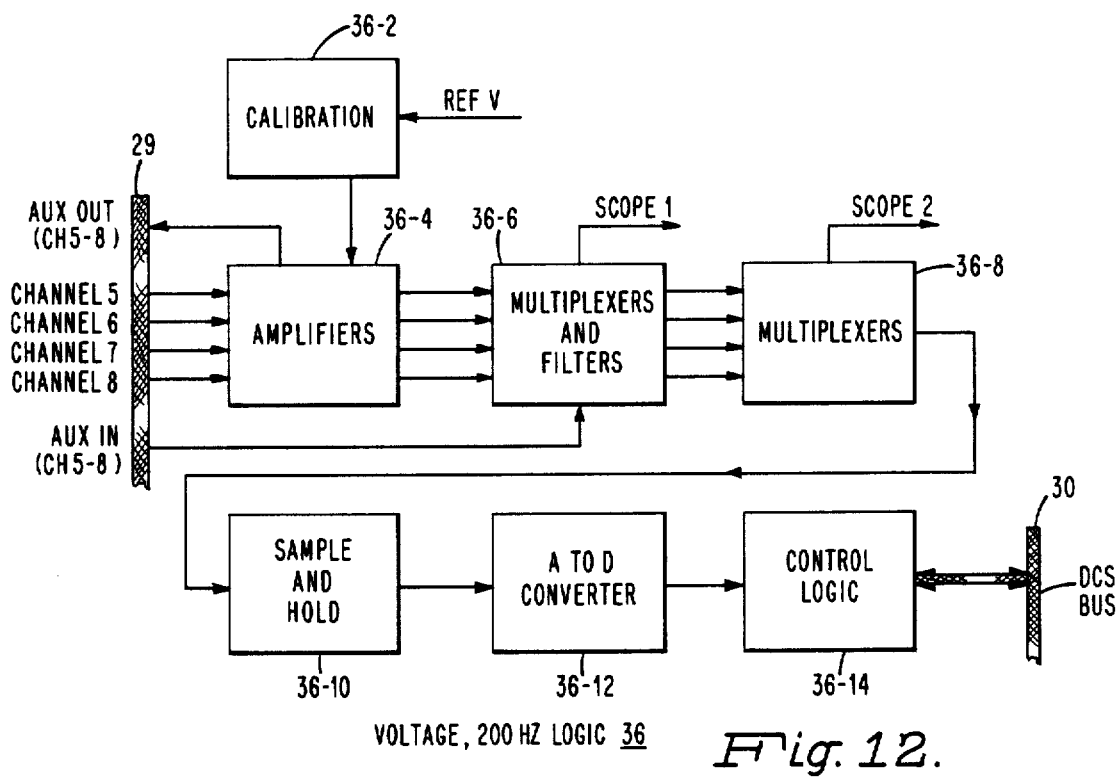
FIG. 12 is a block diagram of 200 Hz voltage logic.

Referring to FIG. 12, 200 Hz voltage logic 36 measures low level, medium frequency voltage signals. It has four signal channels CH5 through CH8 and a maximum 3 dB analog bandwidth of 200 Hz. Each channel has an AUX IN and AUX OUT connection to connection 29 intended for analog recording on, and retrieval of data from, analog recording systems. The input analog signals are sampled and converted at a 1 KHz sample rate. The data is made available to the DCS bus 30 in normalized 16-bit words.

Amplifiers 36-4, which are calibrated by calibration means 36-2 from reference voltage REF V, receive analog signals over channels 5, 6, 7 and 8. Amplifiers 36-4 provide two gain stages to increase the input voltage levels. Multiplexers and filters 36-6 select either the amplified input channels 5 through 8 or the auxiliary channels 5 through 8 to pass the selected signal to an anti-biasing filter.

A channel selection multiplexer 36-8 selects a channel for transfer to sample and hold 36-10. Test signal SCOPE 1 is selected prior to filtering by multiplexers and filters 36-6. Test signal SCOPE 2 is selected after filtering by multiplexer 36-8.

An A to D converter 36-12 converts the voltage level held in sample and hold 36-10 to a 16-bit data word for transfer to control logic 36-14. Control logic 36-14 includes a microprocessor, a RAM, a ROM and a serial data interface. It processes gain selection, converted data transmission, digital auto-correction and interfacing to DCS bus 30.

Figure 13:
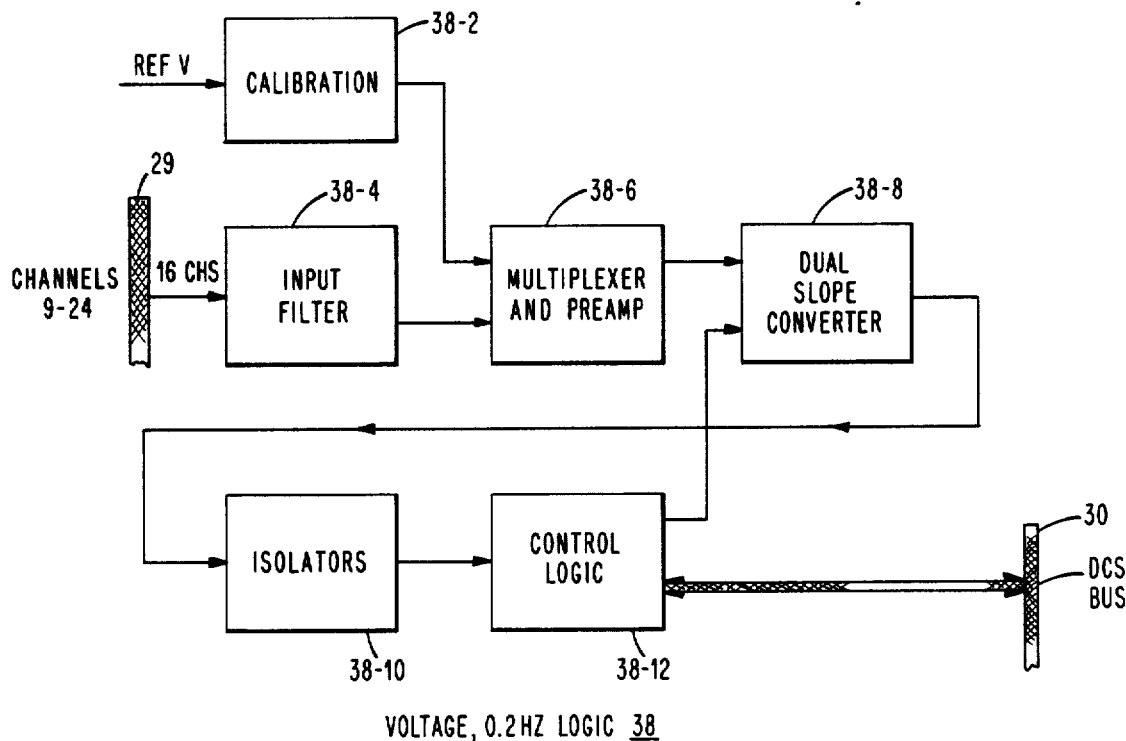
FIG. 13 is a block diagram of 0.2 Hz voltage logic.

Referring to FIG. 13, 0.2 Hz voltage logic 38 measures voltage, current on 4 to 20 milliamp current loops, and low level voltage signals, such as thermocouple outputs. Sixteen analog signals are coupled to a single pole RC input filter 38-4. The 16 filtered channel inputs and a calibration signal from calibration 38-2, which receives reference voltage REF V, are selected by a multiplexer and preamp 38-6. The reference signal is applied to the preamplifier for thermocouple applications. The preamplifier provides gain steps for adjusting the voltage level to a dual slope converter 38-8 which uses integration and clock pulse counting to represent the value of the input voltage.

Light coupled isolators 38-10, which include a DC to DC converter and multiplexer relays, select the digitized signal for transfer to DCS bus 30 via control logic 38-12. Control logic 38-12 includes a microprocessor, a RAM, a ROM, the serial digital interface and a circuit to provide timing for dual slope converter 38-8.

Figure 14:
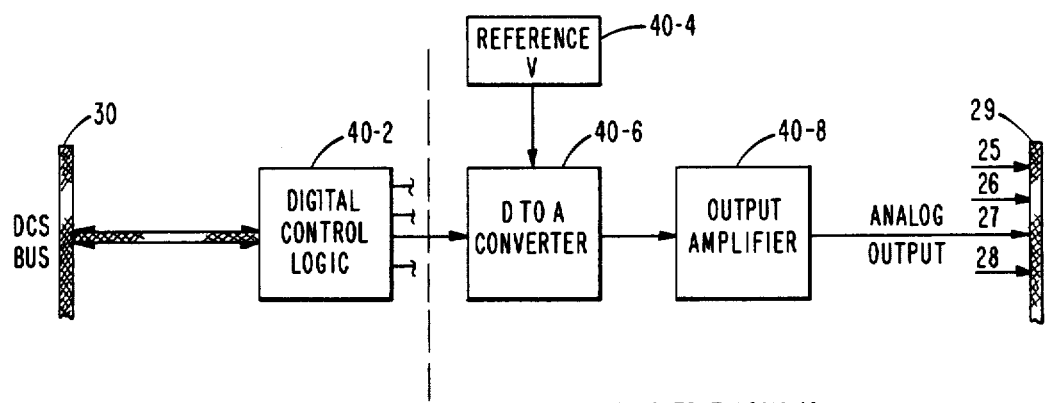
FIG. 14 is a block diagram of analog output logic.

Referring to FIG. 14, analog output logic 40 has four independent channels, each with its own 12-bit D to A converter 40-6, output amplifier 40-8 and reference voltage 40-4. Digital signals are received from DCS bus 30, converted to analog signals and applied to separate terminals of connection 29.

A digital control logic 40-2 receives a 12-bit data word and applies it to one of four D to A converters 40-6. Digital control logic 40-2 includes a microprocessor, a RAM, a ROM and the serial digital interface chips. Compliance and limit circuits monitor the outputs and provide alarm signals to DCS bus 30 via digital control logic 40-2.

Figure 15:
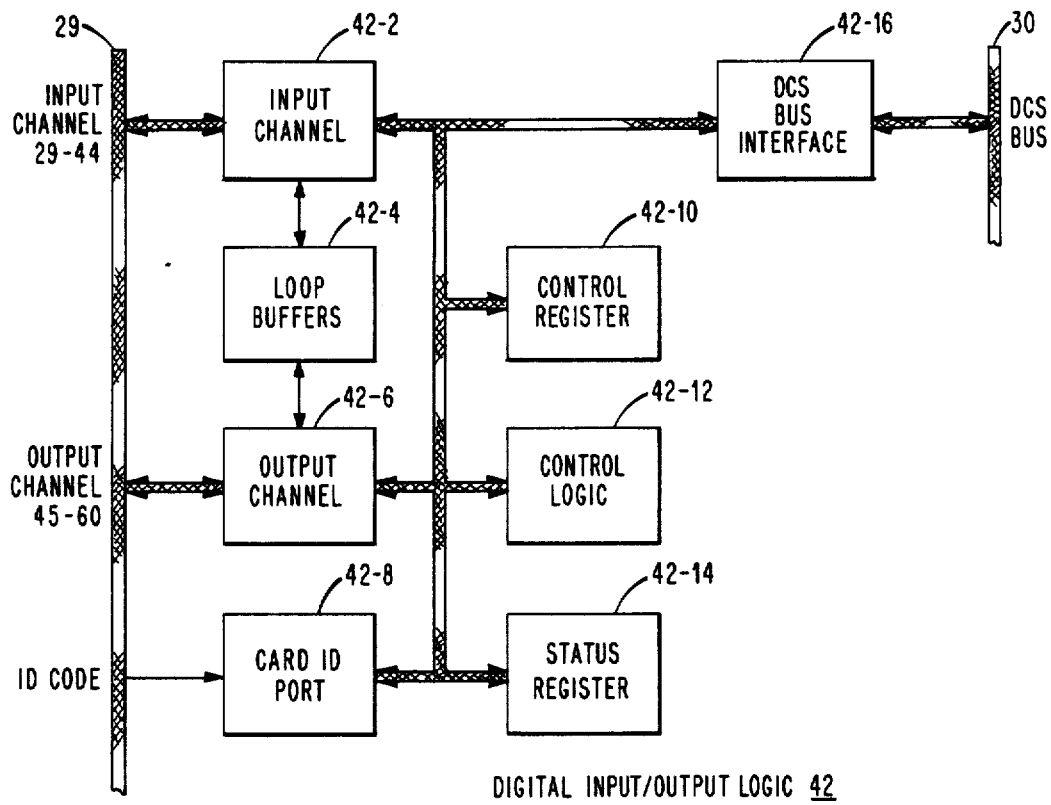
FIG. 15 is a block diagram of digital input/output logic for the system.

Referring to FIG. 15, digital input/output logic 42 provides for 16 input channels 29 through 44, 16 output channels 45 through 60, and 4 identification code (ID) lines coupled to connection 29. An input channel 42-2 can be configured to operate in one of four software selectable modes: word transfer, edge detect, change of state detect or pattern detect. Sampling may be continuous or strobed.

An output channel 42-6 can drive individual lamps, relays or TTL logic. Loop buffers 42-4 enable the interconnection of input channel 42-2 and output channel 42-6 for loopback test purposes.

A card ID port 42-8 receives the ID code identifying the receiving or sending device. A status register 42-14 stores signals typically indicating input channel not ready, output buffer full or empty, and trigger detection status. A control register 42-10 enables the software configuration of various options.

A control logic 42-12 coordinates the functions of the various logic blocks and a DCS bus interface 42-16 interfaces the input/output logic to DCS bus 30.

Figure 16:
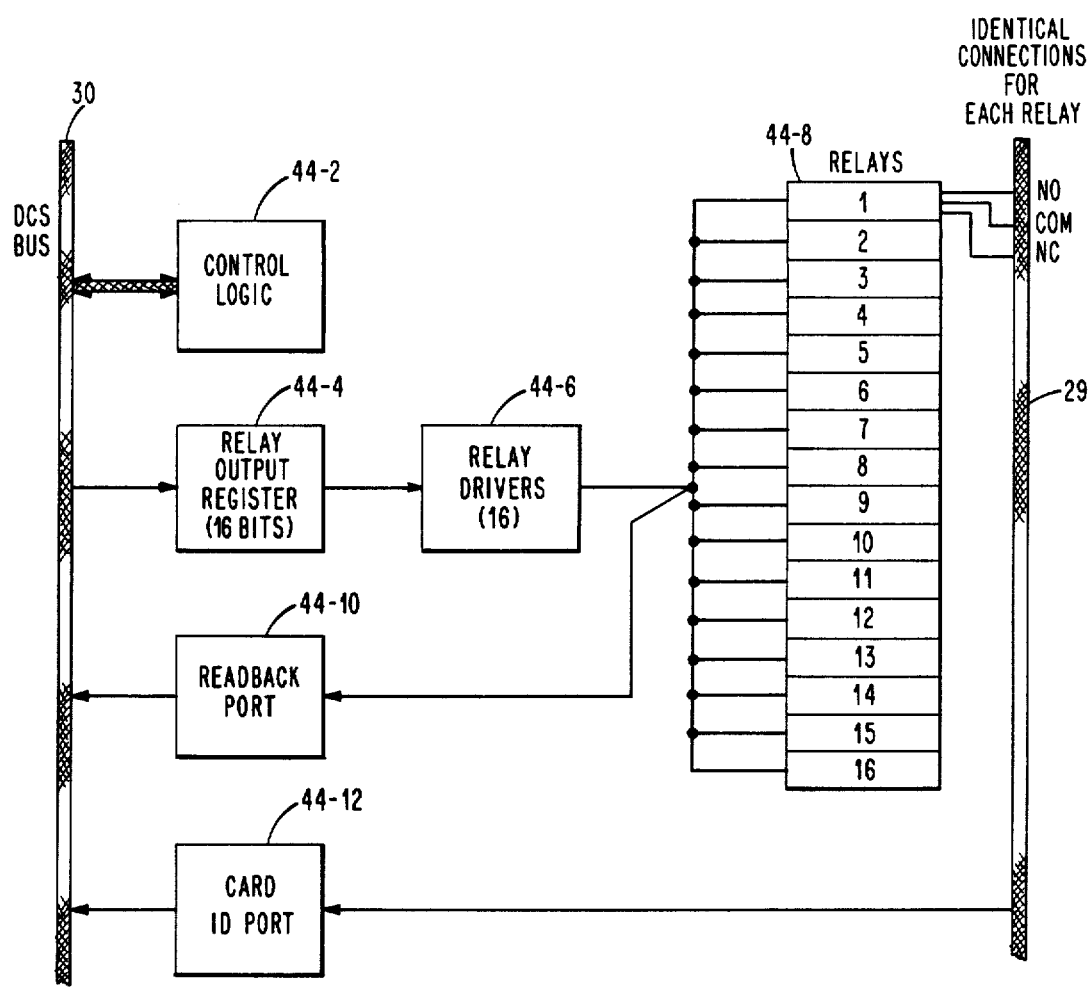
FIG. 16 is a block diagram of relay output logic.

Referring to FIG. 16, relay output logic 44 provides transfer contact outputs for each of 16 relays 44-8. Each transfer contact set includes a normally open (NO), a normally closed (NC) and a common contact. Each relay 44-8 may be of dry reed, non-position sensitive mercury wetted, standard mercury wetted or general purpose design.

Control logic 44-2 coupled to DCS bus 30 controls the various relay functions. A readback port 44-10 reflects the state of each of 16 relay drivers 44-6. A relay output register 44-4 energizes selected relay coils via relay drivers 44-6. A card ID port 44-12 identifies the external unit being activated or deactivated by the transfer contacts.

Figure 17:
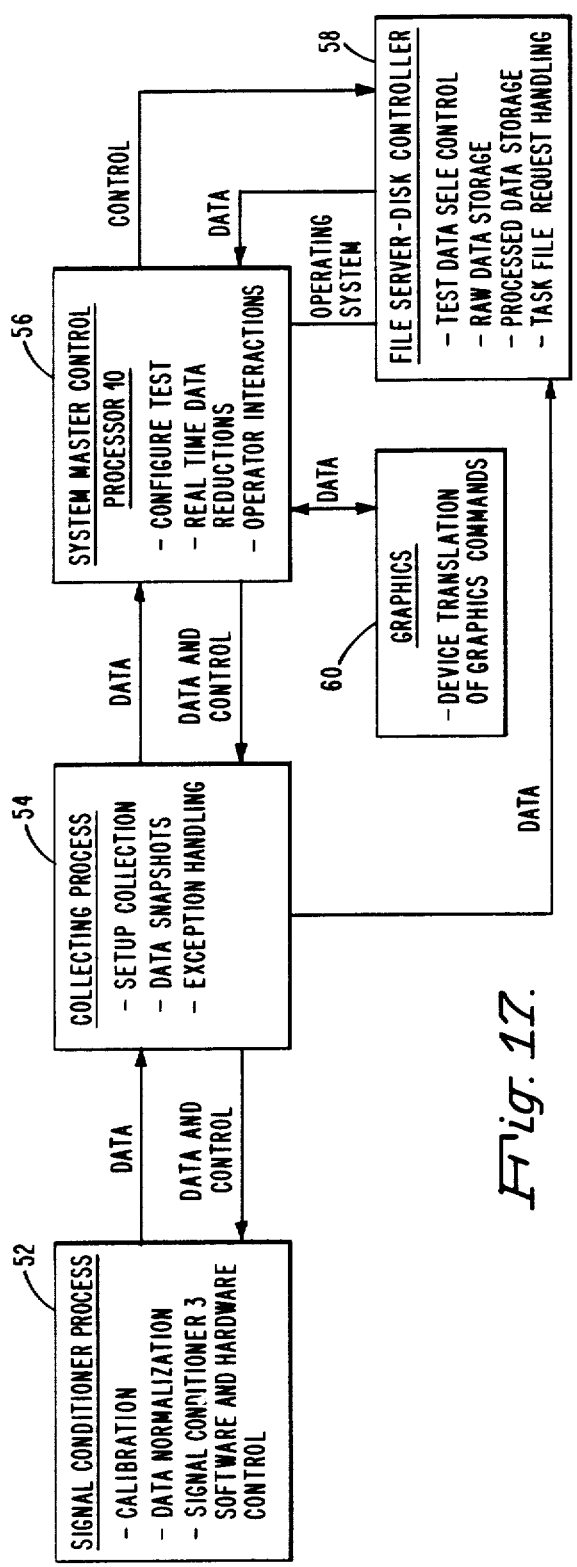
FIG. 17 is an overall block diagram of software for the system.

FIG. 17 shows a diagram of system software blocks. A signal conditioner process 52 is applied to each of the logic blocks 32 through 44 of signal conditioner 3 for conditioning of the data acquisition process. Signal conditioner process 52 provides all of the constants for calibrating each of the logic blocks 32 through 44; it normalizes the digital data outputs of the A to D converters to 16 bits and provides all of the necessary hardware and software control information. For example, the gain is assigned and data is converted for transmission excitation voltages for the various bridges and intercept assignments. Also, the hardware is set up for certain calculations such as slope, and the GET signal to which the logic blocks 32 through 44 will respond is selected. Signal conditioner process 52 receives the data and control information from a collecting process 54, as well as supplying the acquisition data to collecting process 54.

Collecting process 54 conditions sequencer 4 and collect processor 2 to receive the digital data from signal conditioner 3 and transfer it over VME bus 28 to global memory 8 as described in the aforementioned application Ser. No. 705,164. Collecting process 54 may also condition sequencer 4 and collect processor 2 to take a data snapshot, that is, to receive a fixed number of data words from signal conditioner 3 for special analysis.

The collecting process 54 provides exception handling. As an example, collecting process 54 may receive an error indication from a particular logic block 32 through 44. On receipt of the error indication, collecting process 54 may interrupt the acquisition process to branch to a routine to handle the error.

A system master 56 conditions control processor 10 to provide the control and data to enable collecting process 54. System master 56 also provides the software to verify the configuration of the data acquisition system by checking that all required units are coupled to the system.

System master 56 conditions control processor 10 to receive the raw data and either store it on hard disk 26 or perform some analysis on the raw data. The analysis is divided into two parts: the real time analysis and the background analysis. The real time analysis may be typically limit checking. Background analysis using operations such as fast Fourier transforms may be performed on data in a data snapshot.

System master control 56 in conjunction with graphics 60 provides the necessary graphics commands to allow an operator to communicate with the data acquisition system.

A file server 58 is associated with disk controller 22. Disk controller 22 stores raw data from global memory 8 on hard disk 26. Control processor 10 initiates test data file control to be stored with the raw data to be used when the data is read. The test data includes header information such as when the test started and stopped, the sample rate, the clock time associated with detected events and also derived channels. Derived channels are generated by combining input channels to signal conditioner 3. Processed data may be stored and read from hard disk 26.

System master 56 and filer server 58 provide a dual operating system, each operating independently of the other to control control processor 10 and disk controller 22, respectively. Task file request handling does the normal housekeeping of opening, closing, reading and writing files, as well as managing the UNIX directing structure.

Figure 18:
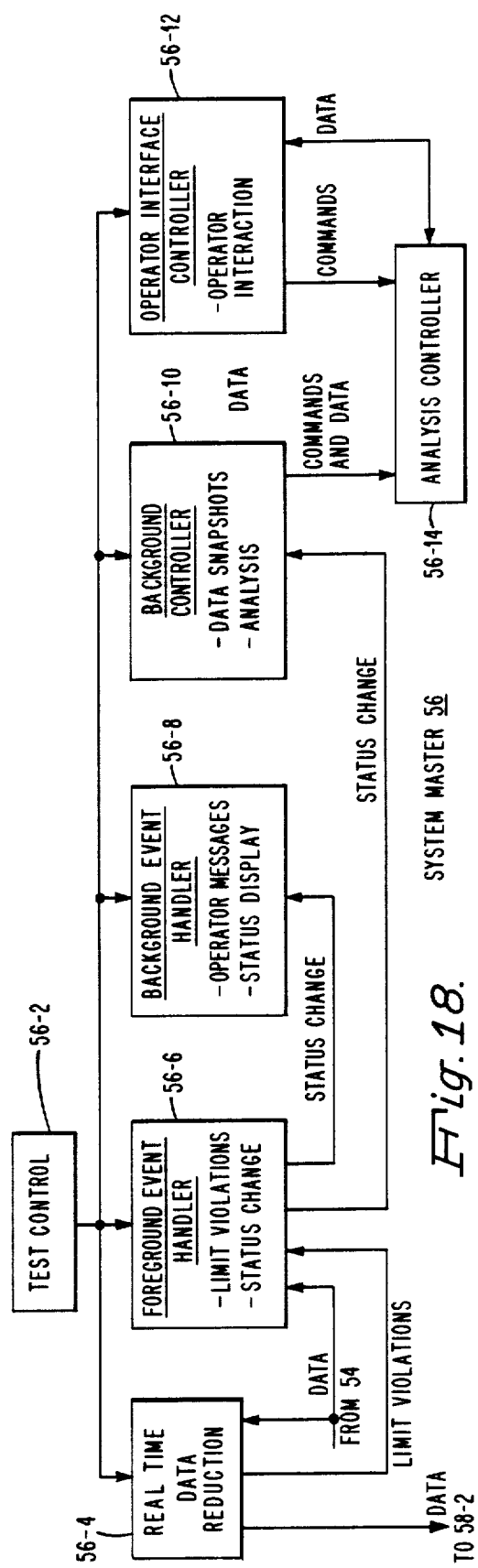
FIG. 18 is a block diagram of the system master operating system.

FIG. 18 shows the software logic blocks of system master 56. A test control 56-2 controls all of the tests performed by system master 56. A real time data reduction 56-4 checks the upper limit, lower limit and delta limit of the data received. The delta limit is exceeded if the difference between two successive readings is greater than the delta value. Real time data reduction 56-4 also generates the derived channel from selected input channels to signal conditioner 3.

Any limit violations are provided to a foreground event handler 56-6 which, under control of test control 56-2, processes the limit violation to cause the data acquisition system to take a specified action. Also, any status change which is indicated by the data from collecting process 54 or from a background event handler 56-8 is processed by foreground event handler 56-6 which notifies both background event handler 56-8 and a background controller 56-10 of the status change. Typical status changes are activating and deactivating scan groups and changing channel parameters, such as gain and range, on the fly. Background event handler 56-8, under control of test control 56-2, displays the status change and informs the operator via graphics 60.

Background controller 56-10, under control of test control 56-2, analyzes data snapshots in light of any status change and provides the information to an analysis controller 56-14. An operator interface controller 56-12 receives information from test control 56-2 as well as from background controller 56-10 to establish a course of action; for example, to display a graph of the analysis. Analysis controller 56-14 would provide that data to operator interface controller 56-12 to be displayed or printed.

Figure 19:
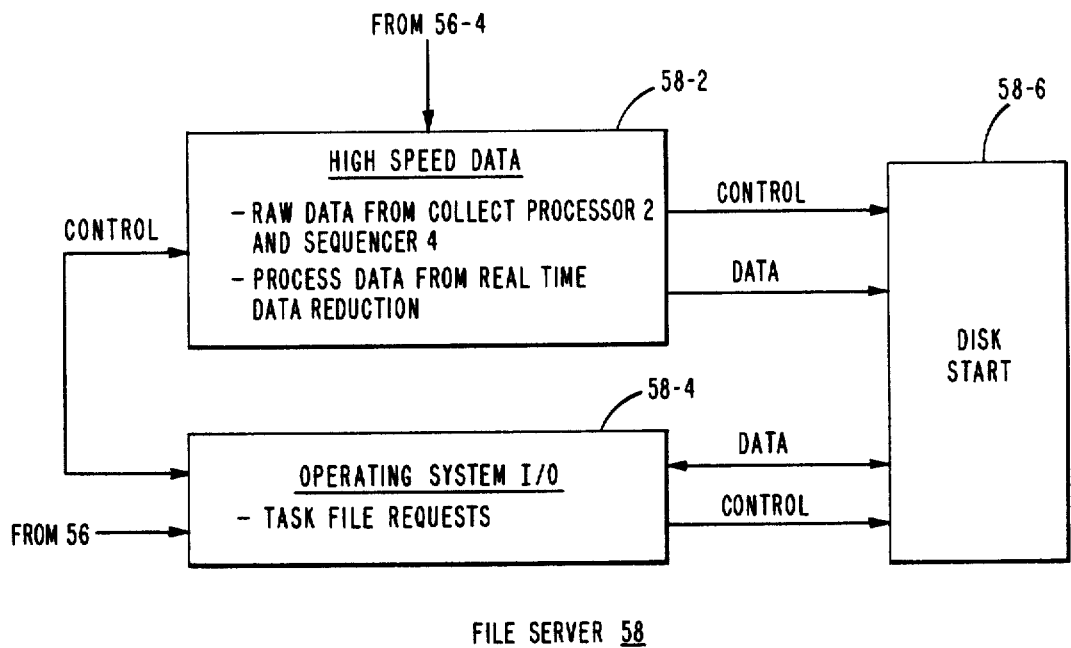
FIG. 19 is a block diagram of the file server operating system.

FIG. 19 shows a block diagram of file server 58. A high speed data block 58-2 receives data from collect processor 2 and sequencer 4, as well as from real time data reduction which are the derived channels, and stores the data on hard disk 26 by means of a disk start 58-6. Disk start 58-6 conditions disk controller 22. An operating system I/O 58-4 handles requests for file I/O (reading, writing, opening and closing files) from tasks which reside in the control processor 10 tasking kernel.

Having shown and described a preferred embodiment of the invention, those skilled in the art will realize that many variations and modifications may be made and still be within the scope of the claimed invention. Thus, many of the elements indicated above may be altered or replaced by different elements which will provide the same result and fall within the spirit of the claimed invention. It is intended, therefore, to limit the invention only as indicated by the scope of the claims.

What is claimed is:

1. (Amended) A test management system for acquiring, processing and displaying test data comprising:
    signal conditioner process means for sampling a plurality of analog signals, having means for converting each sample of said plurality of analog signals to normalized digital data signals and having means for storing said normalized digital data signals;
    collecting process means coupled to said signal conditioner process means and having addressing means for addressing said storing means and receiving said normalized digital data signals, said collecting process means further having memory means for storing said normalized digital data signals;
    file server means coupled to said collecting process means for storing said normalized digital data signals received from said memory means;
    system master means coupled to said file server means and said collecting process means and having means for analyzing said normalized digital data signals received from said memory means and said file server means, said system master means further having real time data reduction means coupled to said test control means and said collecting process means for receiving said normalized digital data signals from said collecting process means for checking against predetermined limits and generating limit violation signals if said predetermined limits are exceeded; and
    graphics means responsive to said system master means for displaying the result of analyzing said normalized digital data signals.

2. (Amended) The test management system of claim 1 wherein said system master means further comprises:
    foreground event handler means coupled to said test control means and said real time data reduction means and responsive to data signals from said collecting process means indicating a status change to generate status change signals or responsive to said limit violation signals for generating said status change signals indicative of an out of limit condition.

3. The test management system of claim 2 wherein said system master means further comprises:
    background event handler means coupled to said test control means and said foreground event handler means and responsive to said status change signals for sending the status change information to graphics means for display.

4. The test management system of claim 3 wherein said system master means further comprises:
    background controller means coupled to said test control means and said collecting process means for receiving data snapshots of said normalized digital data signals for performing said analyzing and generating analyzed data signals.

5. The test management system of claim 4 wherein said system master means further comprises:
    analysis controller means coupled to said background controller means and responsive to said analyzed data signals for generating display signals.

6. The test management system of claim 5 wherein said system master means further comprises:
    operator interface controller means coupled to said test control means, said background controller means and said analysis controller means for receiving said analyzed data signals for display on a monitor or a printer.

7. The test management system of claim 6 wherein said file server means comprises:
    high speed data means coupled to said collecting process means for receiving said normalized digital data signals from said memory means and generating disk data signals and coupled to said real time data reduction means for receiving derived channel signals indicative of combining the normalized digital data signals of a plurality of analog signal channels and generating said disk data signals.

8. The test management system of claim 7 wherein said file server means comprises:
    disk start means coupled to said high speed data means and generating write request control signals for storing said disk data signals.

9. The test management system of claim 8 wherein said file server means comprises:
    operating system means coupled to said system master means for receiving file I/O request signals for generating read request control signals for reading said disk data signals.

10. The test management system of claim 1 wherein said converting means is an analog to digital converter.

11. The test management system of claim 1 wherein said memory means is control logic.

12. The test management system of claim 1 wherein said collecting process means includes a sequencer and a collect processor.

13. The test management system of claim 1 wherein said memory means includes a global memory.

14. The test management system of claim 1 wherein said file server means includes a disk drive.

15. The test management system of claim 1 wherein said system master means includes a control processor.

16. (Amended) A test management system which acquires and analyzes digital data obtained by sampling analog signals and digital signals received from a plurality of input channels and includes two operating systems operating independently of each other, said test management system comprising:
    global memory means for storing control information and said digital data;

system master operating system means coupled to said global memory means and responsive to said control information and said digital data for verifying the configuration of said system, testing said digital data in accordance with said control information for limit violations and analyzing test samples of said digital data in accordance with said control information, in order to initiate a predetermined action; and file server operating system means coupled to said global memory means and said system master operating system means for storing said digital data received from said global memory means, and storing header information received from said system master operating system means.

17. The test management system of claim 16 wherein said system master operating system means comprises:

first memory means for storing a first set of instructions representative of the functions of a system master operating system; and first microprocessor means coupled to said first memory means and said global memory means for executing said first set of instructions which process said digital data received from said global memory.

18. The test management system of claim 17 wherein said file server operating system means comprises:

second memory means for storing a second set of instructions representative of the functions of a file server operating system; and second microprocessor means coupled to said second memory means and said global memory means for executing said second set of instructions which transfer said digital data between said global memory and a disk drive.

* * * * *